United States Patent
Aoki et al.

(10) Patent No.: US 10,885,502 B2
(45) Date of Patent: *Jan. 5, 2021

(54) USING DISBURSEMENT SIGNALS AT PAYMENT SYSTEMS

(71) Applicant: PAYPAL, INC., San Jose, CA (US)

(72) Inventors: Norihiro Aoki, San Jose, CA (US); Aarti Bharathan, San Jose, CA (US); Anthony Shakrala Allen, San Jose, CA (US); Arjun Abraham Mathew, San Jose, CA (US)

(73) Assignee: PAYPAL, INC., San Jose, CA (US)

( * ) Notice: Subject to any disclaimer, the term of this patent is extended or adjusted under 35 U.S.C. 154(b) by 710 days.

This patent is subject to a terminal disclaimer.

(21) Appl. No.: 15/339,697

(22) Filed: Oct. 31, 2016

(65) Prior Publication Data
US 2018/0089650 A1    Mar. 29, 2018

Related U.S. Application Data

(60) Provisional application No. 62/401,130, filed on Sep. 28, 2016.

(51) Int. Cl.
*G06Q 20/12* (2012.01)
*G06Q 30/06* (2012.01)

(52) U.S. Cl.
CPC ......... *G06Q 20/12* (2013.01); *G06Q 30/0609* (2013.01); *G06Q 30/0635* (2013.01)

(58) Field of Classification Search
CPC . G06Q 20/12; G06Q 30/0635; G06Q 30/0609
See application file for complete search history.

(56) References Cited

U.S. PATENT DOCUMENTS 5,797,005 A * 8/1998 Bahls ............... G06F 9/546
719/314
7,124,110 B1 10/2006 Kemp, II et al.
(Continued)

FOREIGN PATENT DOCUMENTS

JP    6678726 B2 * 4/2020 ............. G06Q 20/40

OTHER PUBLICATIONS

Athuraliya et al. "REM: Active Queue Management", IEEE Network 15.3 (2001), pp. 48-53 (Year: 2001).*

(Continued)

*Primary Examiner* — Hani M Kazimi
*Assistant Examiner* — Alison L. Lamb
(74) *Attorney, Agent, or Firm* — Haynes and Boone, LLP

(57) ABSTRACT

A method for reconfiguring disbursement signals at a payment system is discussed. The method includes receiving a general disbursement signal for triggering a first fund transfer of a portion of funds from a buyer account to a general account at the payment system, the first fund transfer for purchasing an item via a marketplace. The method includes, in response to receiving the general disbursement signal, performing the first fund transfer. The method includes determining whether a merchant disbursement signal is received from a second source, the merchant disbursement signal for triggering a second fund transfer of a portion of the funds from the general account to the merchant account. The method also includes determining, based on whether the merchant disbursement signal is received from the second source, whether to reconfigure a disbursement module to receive a different merchant disbursement signal for triggering the second fund transfer.

20 Claims, 13 Drawing Sheets

(56) References Cited

U.S. PATENT DOCUMENTS

| | | |
|---|---|---|
| 7,349,340 B2 | 3/2008 | Sahai et al. |
| 7,679,522 B2 | 3/2010 | Carpenter |
| 7,953,642 B2 | 5/2011 | Dierks |
| 8,463,627 B1 | 6/2013 | Hirose et al. |
| 9,053,058 B2 | 6/2015 | Saund et al. |
| 10,134,081 B2 * | 11/2018 | Weber ............... G06Q 30/0637 |
| 2001/0054012 A1 | 12/2001 | Nayyar |
| 2003/0163379 A1 * | 8/2003 | Engelhart ............ G06Q 20/02 |
| | | 705/75 |
| 2008/0133349 A1 | 6/2008 | Nazer et al. |
| 2011/0004788 A1 | 1/2011 | Petit et al. |
| 2011/0046969 A1 | 2/2011 | Carlson et al. |
| 2011/0302060 A1 | 12/2011 | Cano |
| 2013/0024361 A1 * | 1/2013 | Choudhuri ........... G06Q 40/02 |
| | | 705/39 |
| 2013/0046598 A1 | 2/2013 | Roberts |
| 2013/0051237 A1 * | 2/2013 | Ong ................... H04L 47/6255 |
| | | 370/237 |
| 2013/0058476 A1 | 3/2013 | Huang |
| 2013/0325737 A1 * | 12/2013 | Smalling ............ G06Q 10/083 |
| | | 705/330 |
| 2014/0052586 A1 | 2/2014 | Weber |
| 2015/0012303 A1 * | 1/2015 | Ghosh .................. G06Q 50/16 |
| | | 705/4 |
| 2015/0269578 A1 | 9/2015 | Subramanian et al. |
| 2016/0093009 A1 | 3/2016 | Goldklang et al. |
| 2017/0103457 A1 * | 4/2017 | Acuna-Rohter ....... G06Q 20/10 |

OTHER PUBLICATIONS

Thiruchelvi et al. "A survey on active queue management mechanisms", International Journal of Computer Science and Network Security, Aug. 12, 2008), pp. 130-145, (Year: 2008).

\* cited by examiner

USING DISBURSEMENT SIGNALS AT PAYMENT SYSTEMS

RELATED MATTERS

This application claims priority to and the benefit of U.S. Provisional Patent Application Ser. No. 62/401,130, titled "USING DISBURSEMENT SIGNALS AT PAYMENT SYSTEMS" filed on Sep. 28, 2016, the contents of which are hereby incorporated by reference in its entirety.

BACKGROUND

Embodiments of the present disclosure generally relate to the field of communication systems and, more particularly, to managing queues for processing transactions that can be communicated using communication systems and managing disbursement signals at a payment system.

An online marketplace is a platform that facilitates interaction between buyers and sellers. The online marketplace can receive orders, via a communication network, from buyers to purchase items from the sellers. For example, a buyer can generate a cart that includes orders to purchase items from multiple sellers. The cart can then be communicated by the online marketplace to a payment system to facilitate processing of payments from the buyer to the sellers for the ordered items. At the payment system, the orders in the cart can be processed. The payment system can process the orders by performing risk analysis, payment processing, and initiate order fulfillment. However, the payment system may not be able to properly process all the orders and/or carts when dealing with large volumes of orders and/or spikes in volume of carts. Furthermore, the payment system may not be able to properly disburse funds for the items.

BRIEF DESCRIPTION OF THE DRAWINGS

The present embodiments may be better understood, and numerous objects, features, and advantages made apparent to those skilled in the art by referencing the accompanying drawings.

DESCRIPTION OF EMBODIMENT(S)

Figure 1:
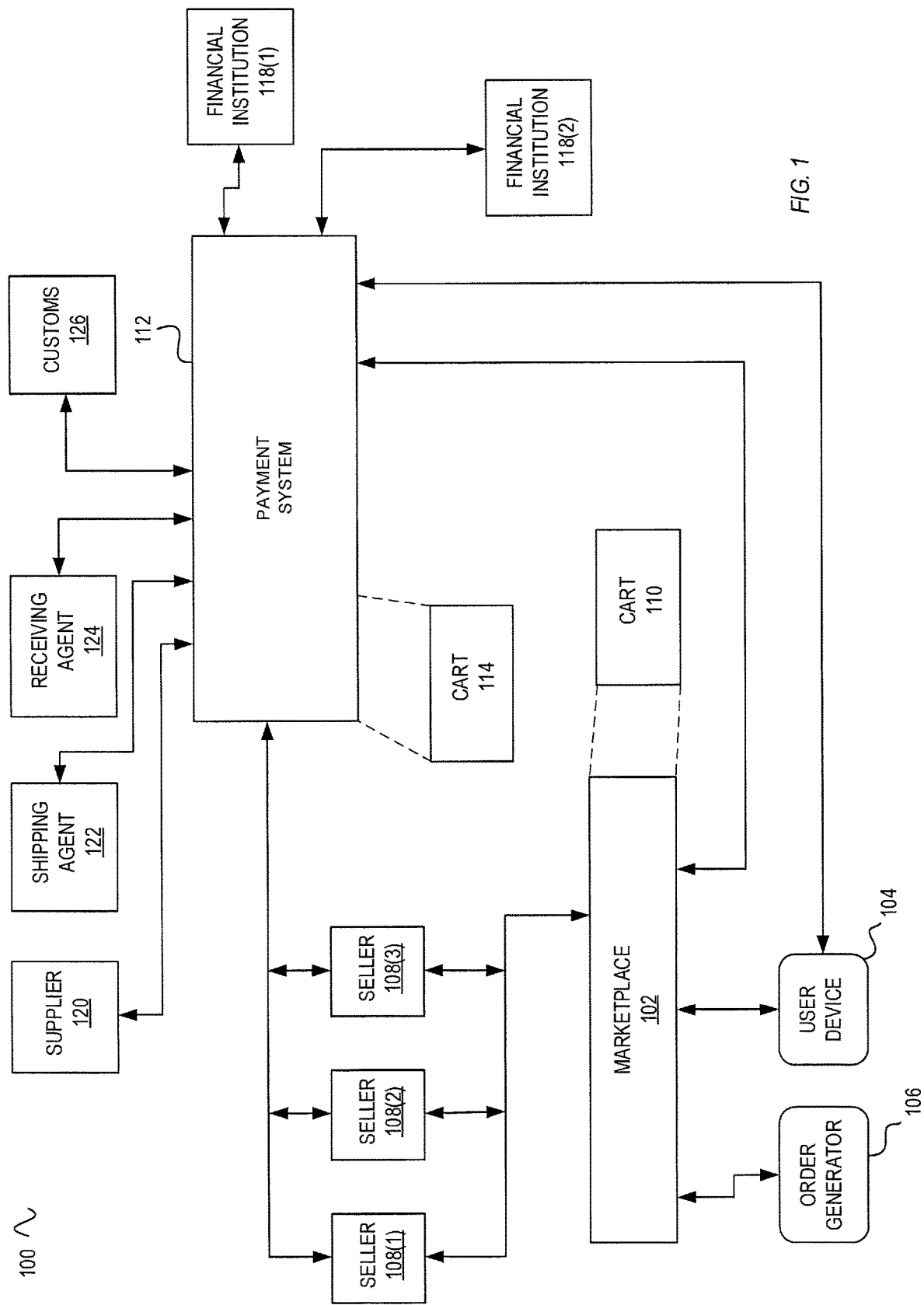
FIG. 1 is a system diagram illustrating embodiments of a communication system showing a payment system communicating with a marketplace.

The description that follows includes exemplary systems, methods, techniques, instruction sequences and computer program products that embody techniques of the present disclosure. However, it is understood that the described embodiments may be practiced without these specific details. For instance, although some examples refer to online marketplaces, other types of shopping and service providers are contemplated.

Transaction queues can be used to store orders received, via a communication network, to purchase items. For example, a user can place an order in a virtual cart (referred to herein as a "cart" for simplicity) via an online marketplace or via another type of a shopping website. The cart can include multiple orders for items from multiple sellers. The cart can then be communicated to the payment system. Each item can be a product or a service.

Prior to accepting the cart for processing into the transaction queue ("queueing"), the payment system can perform an initial risk analysis on the entire cart to determine whether to accept or reject the entire cart. The initial risk analysis may be a cart-level analysis, where the payment system determines an initial risk level for the entire cart, and not on an order level. If the initial risk analysis indicates that the cart can be accepted for processing, then the payment system can add transaction requests to the transaction queue, where each transaction request corresponds to an order for an item of the accepted cart. If the initial risk analysis indicates that the cart cannot be accepted for processing, then the payment system can in some cases reject the entire cart, and not add to the transaction queue any transaction requests for the items of the rejected cart. The "queued" items from an accepted cart may be stored in the transaction queue until an event (e.g., a customer-defined trigger, a merchant-defined trigger, a time-defined trigger) causes "de-queuing" of the items for further processing.

The payment system can select a requested transaction for de-queueing, and then de-queue (also referred to as performing a de-queue operation) the selected requested transaction from the transaction queue. The payment system can perform a second risk analysis on the de-queued requested transaction to determine whether to process a payment for the selected transaction. The second risk analysis is a transaction-level analysis that determines a second risk level for a certain requested transaction. If the second risk analysis indicates that the requested transaction is to be processed, the payment system may initiate payment and fulfillment operations for the requested transaction. Alternatively, if the second risk analysis indicates that the requested transaction is not to be processed, the payment system may discard the requested transaction, or simply not process the requested transaction. If the second risk analysis indicates that the requested transaction is not to be processed, the payment system may also select a next requested transaction for de-queueing from the transaction queue.

The payment system can manage the de-queueing of requested transactions from the transaction queue. The payment system can determine a queue capacity of the transaction queue, where the queue capacity indicates capacity of the transaction queue to store a certain number of requested transactions. In some embodiments, the payment system can determine a transaction capacity of a processing module. The payment system can include a processing module that de-queues and processes requested transactions. The transaction capacity indicates capacity of the processing module to process a number of requested transactions. The payment system can determine, based on the queue capacity and the transaction capacity, whether to limit a de-queue rate at which the requested transactions are de-queued from the transaction queue by the processing module. In response to determining to limit the de-queue rate, the payment system can adjust operation of the processing module, or a portion the processing module.

In some embodiments, the payment system can determine a transaction rate of the processing module. The transaction rate indicates a rate at which the requested transactions are de-queued from the transaction queue by the processing module and transmitted to the risk module for performing transaction-level risk analyses on each de-queued requested transaction. The payment system can determine, based on the transaction queue capacity and the transaction rate, whether to increase the processing rate at which the requested transactions are transmitted by the processing module to the risk module. In response to determining to increase the processing rate, the payment system can resize the processing module. The following description, and associated Figures, illustrates various embodiments directed to the ideas listed above.

In some embodiments, the payment system can manage disbursement signals. The disbursement signals can be used by a disbursement module of the payment system for triggering fund transfers between various payment accounts. The payment system can select a source of a general disbursement signal indicating a requested transfer of a first portion of funds from a buyer payment account to a general payment account at the payment system. The payment system can determine a merchant disbursement event for transferring a second portion of the funds from the general payment account to a merchant payment account. The payment system can select, based on the merchant disbursement event, a source of a merchant disbursement signal, the merchant disbursement signal indicating a requested transfer of the second portion of the funds from the general payment account to the merchant payment account. The method also includes configuring a disbursement module to trigger a transfer of the first portion of the funds in response to receiving the general disbursement signal and to trigger a transfer of the second portion of the funds in response to receiving the merchant disbursement signal.

The payment system can receive the general disbursement signal for triggering the first fund transfer. The payment system can, in response to receiving the general disbursement signal, perform the first fund transfer of the first portion of funds from the buyer payment account to the general payment account at the payment system. The payment system can determine whether the merchant disbursement signal is received from the second source. The payment system can determine, based on whether the merchant disbursement signal is received from the second source, whether to reconfigure the disbursement module to receive a different merchant disbursement signal for triggering the second fund transfer. The following description, and associated Figures, illustrates various embodiments directed to the ideas listed above.

FIG. 1 is a system diagram illustrating embodiments of a communication system showing a payment system communicating with a marketplace. In an overview of the system diagram 100, a marketplace 102 allows a user device 104 and/or an order generator 106 to order items from sellers 108(1)-108(3). The user device 104 and/or the order generator 106 can generate a cart 110 that includes orders from the sellers 108(1)-108(3). The cart can then be communicated to the payment system 112. The user device 104 and the order generator 106 perform functionality of a buyer that purchases items from the sellers 108(1)-108(3) via the marketplace 102. The payment system 112 processes the cart and determines when to disburse funds for the items of the cart, such as based on disbursement signals that can be received from a supplier 120, a shipping agent 122, a receiving agent 124, and customs 126, as well as from the buyer, and/or the seller 108(1).

The marketplace 102 can be a software application that can receive orders, via a communication network, from buyers to purchase items. For example, a user device 104 can be used to generate the cart 110 to purchase multiple items via the marketplace 102. The cart 110 includes orders for items that are to be bought by a buyer (e.g., a user of the user device 104) from the sellers 108(1)-108(3) (as also shown below with reference to FIG. 2). The marketplace 102 can then communicate the cart 110 to the payment system 112 for processing.

The payment system 112 can receive the cart 110 and process the cart 110 as a cart 114. In one embodiment, the cart 114 is substantially the same as the cart 110. In another embodiment, the payment system 112 modifies the cart 110 to generate the cart 114, such as by associating cart characteristics with the cart 114. The cart characteristics can indicate priority of each of the sellers 108(1)-108(3), quality of service (QoS) characteristics of the cart 114 and/or of individual orders of the cart 114, among others. It is noted that the marketplace 102 is shown for explanation purposes only. The queue management methods and systems of the payment system 112 described herein can operate on requested transaction that correspond to orders of the cart 114, regardless of whether the cart 114 was received from the marketplace 102, from a shopping website, or from another software entity that generates carts of orders for items to be purchased.

The user device 104 can be any type of a computing device that can select, via the marketplace 102, and transmit communication indicating orders to the marketplace 102. For example, the user device 104 can include a user interface (UI) through which the user can select items for purchase via the marketplace 102. The order generator 106 can be a software application that can generate the cart 110 with orders for purchase via the marketplace 102. For example, the order generator 106 can be a software application that automatically renews certain orders once a month.

Each of the sellers 108(1)-108(3) can 1) indicate which items are for sale via the marketplace, and 2) ship the items (e.g., once received confirmation of payment from the payment system 112). For example, the seller 108(1) can be a book seller that indicates books that are for sale via the marketplace 102. The seller 108(2) can be a bicycle store that sells bicycle parts, and the seller 108(3) can be a videogame store that sells used videogames.

The marketplace 102 interfaces with the payment system 112 to provide the cart 110 to the payment system 112 for processing. In one embodiment, the payment system 112 can process the payment and order fulfillment for the orders in the cart 114. The payment system 112 can perform an initial cart-level risk analysis on the entire cart 114 to determine whether or not to accept the cart 114. When processing requested transactions for the cart orders, the payment system 112 can perform transaction-level risk analysis on individual requested transactions. Each transaction request can correspond to an order for an item of the accepted cart 114. If the risk level for each requested transaction is acceptable, the payment system 112 can process payments from buyer accounts associated with the user device 104 and/or order generator 106. The payment system 112 can then send the payments to sellers 108(1)-108(3). The payment system 112 can also initiate order fulfillment for items of the cart 114, and can notify the sellers 108(1)-108(3) when the items can be shipped to the buyer.

The payment system 112 can provide financial services, such as a fund transfer (e.g., a transfer of a certain monetary amount), to the marketplace, 102, buyers, and/or sellers. The payment system 112 can include payment accounts, each of which can be associated with a buyer or a seller. For example, a buyer (e.g., a user of the user device 104) can be associated with one payment account, and the seller 108(1) can be associated with another payment account at the payment system 112. Upon successfully performing the transaction-level risk analysis on a requested transaction for an order, the payment system 112 can then perform a fund transfer from the buyer's payment account to the seller's payment account. The payment system 112 can be implemented by PAYPAL or another online payment system that allows users to send, accept, and request fund transfers.

Financial institutions 118(1) and 118(2) (collectively referred to as financial institutions 118) can provide financial services to users. Financial institutions 118 can be implemented as banks, credit unions, other deposit-taking institutions that accept and manage deposits and make loans, and other financial service providers. In some embodiments, the financial institutions 118 can include credit card networks, e.g., for funding transfer of money between users. In some embodiments, financial institutions 118 may include a provider of purchasing power that is associated with a loyalty program. In one embodiment, the payment system 112 can access funds associated with the buyer's payment account by accessing the financial institution 118(1), and transfer these funds to the seller's payment account by accessing the financial institution 118(2).

The payment system 112 can determine whether and when to disburse funds for each item of the cart 114. For example, for a certain item of the cart 114, the payment system 112 can determine when to disburse portions(s) of funds for purchasing the item based on associated disbursement signals. Disbursement signals are associated with the item when they relate to triggering of fund transfers for that item. Each of the supplier 120, the shipping agent 122, the receiving agent 124, and the customs 126 (referred to as "transaction partners" for simplicity) can provide a separate disbursement signal to the payment system 112 indicating a requested transfer of a certain portion of the funds from a general payment account to the merchant payment account at the payment system 112. Details of how the payment system 112 configures and uses various disbursement signals are described below with reference to FIG. 2.

For simplicity, FIG. 1 only shows a single supplier 120, a single shipping agent 122, a single receiving agent 124, such associated with a certain item of the cart 114. However, as discussed herein, each of the items of the cart can be associated with a separate supplier, shipping agent, and/or receiving agent, each of which can provide a separate disbursement signal to the payment system 112. Furthermore, not every item or cart is associated with a supplier, a shipping agent, a receiving agent, and/or customs. For example, each item of the cart 114 can be associated with the supplier 120 and the shipping agent 122, but not use any receiving agents, or customs. Similarly, each item of another cart can be associated with another shipping agent, the customs 126, and the receiving agent 124, but not use any suppliers.

A supplier, such as the supplier 120, can physically provide the item, or a part of the item, that is being sold by a seller, for shipping by the shipping agent 122. The supplier 120 can be a sub-merchant that provides a part of the item being sold to the seller 108(1). A shipping agent, such as the shipping agent 122, can physically transport the item between the seller (or the supplier that provides the item) and the buyer (or the receiving agent of the buyer). Examples of shipping agents include FEDEX, United Parcel Service (UPS), DHL EXPRESS, and others. A receiving agent, such as the receiving agent 124, can receive the item from the shipping agent. Examples of receiving agents can include companies or people that are authorized to receive the item on behalf of the buyer. Customs, such as the customs 126, can include governmental agencies responsible for regulating and facilitating the shipping of the items of the cart 114 across country boundaries. Examples of customs include the U.S. Customs and Border Protection, and analogous customs for other countries across which the item is being shipped.

Figure 2:
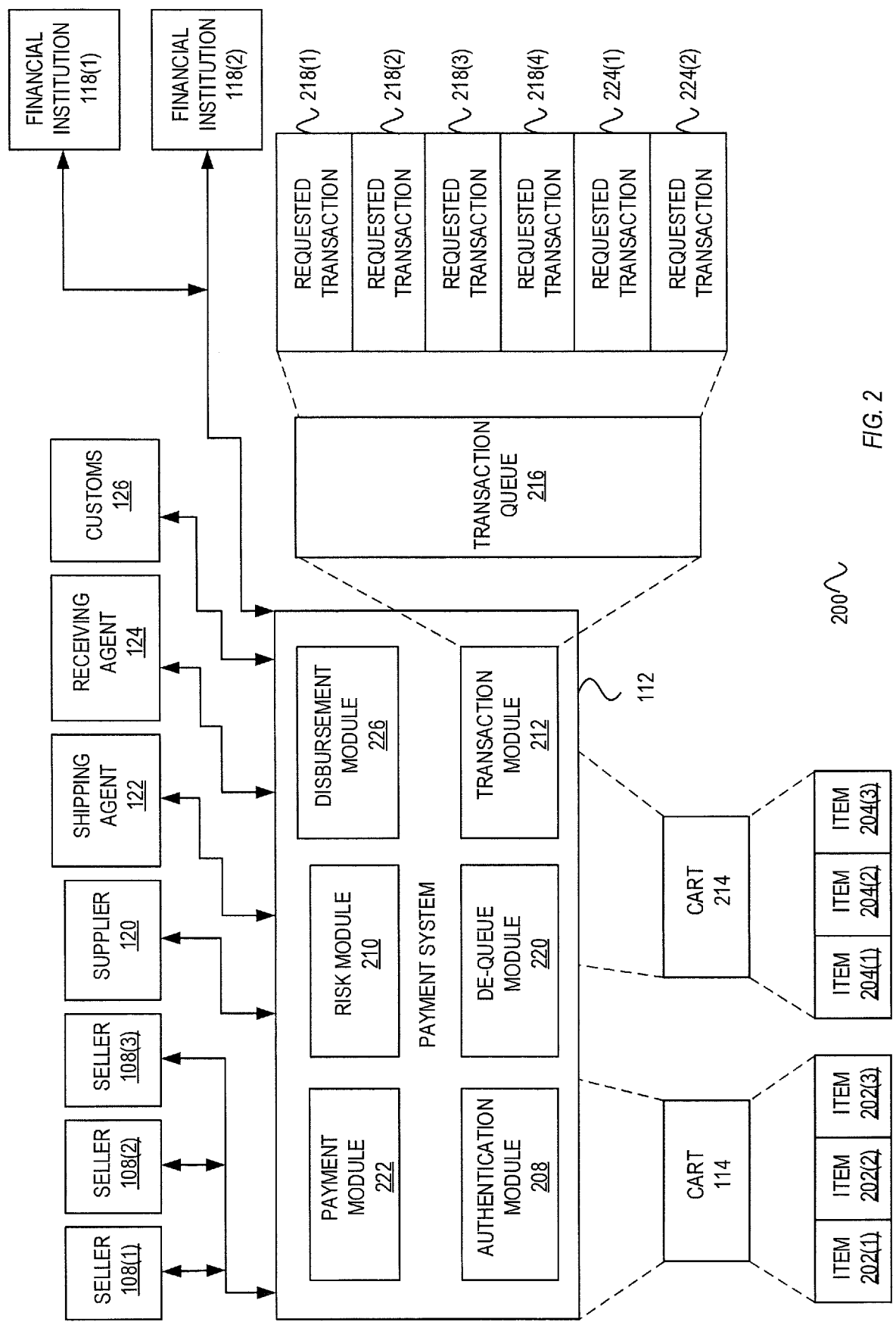
FIG. 2 is a system diagram illustrating embodiments of a payment system that uses a transaction queue to store and process requested transactions.

FIG. 2 is a system diagram 200 illustrating embodiments of a payment system that uses a transaction queue to store and process requested transactions. FIG. 2 shows embodiments of how the payment system 112 queues, de-queues, and processes requested transactions that correspond to orders for items 202(1)-202(3) and 204(1)-204(3) of carts 114 and 214, respectively. The payment system 112 of FIG. 2 includes an authentication module 208, a risk module 210, a transaction module 212, a de-queue module 220, and a payment module 222. The transaction module 212 and the de-queue module 220 access a transaction queue 216 that includes requested transactions 218(1)-218(4), 224(1), and 224(2). The authentication module 208 can be used to authenticate the buyer and/or the sellers 108(1)-108(3).

The payment system 112 can receive and process carts 114 and 214. The cart 114 includes items 202(1)-202(3) for purchase from sellers 108(1)-108(3). The cart 214 includes items 204(1)-204(3) for purchase from sellers 108(1)-108(3). The transaction module 212 can receive the cart 114 and perform an initial risk analysis on the cart 114 to determine whether to accept the cart for processing into the transaction queue 216. The initial risk analysis is a cart-level analysis that generates an initial risk level. The transaction module 212 can communicate with the risk module 210 to obtain the initial risk level for the cart 114. The transaction module 212 can compare the initial risk level to a cart threshold and determine whether to accept the cart 114 or not. A similar initial risk analysis can be performed on the cart 214. In some embodiments, the transaction module 212 can process some requested transactions for the cart 114 (e.g., the requested transactions 218(1) and 218(2)), but reject other requested transactions for the same cart 114 (e.g., the requested transaction 218(3)).

The transaction module 212 can process the cart 114 and add the items 202(1)-202(3) to the transaction queue 216 as requested transactions 218(1)-218(3). Each of the requested transactions 218(1)-218(3) can be a request for a purchase of the items 202(1)-202(3) from the sellers 108(1)-108(3), respectively. A requested transaction 218(4) can be added to the transaction queue 216 as part of the cart 114 after the initial risk analysis is performed on the cart 114, but before all of the requested transactions 218(1)-218(3) are de-queued and processed.

The de-queue module 220 can select a requested transaction to de-queue based on location of the requested transaction in the transaction queue 216, such as by selecting the most recently added requested transaction or the oldest requested transaction. The de-queue module 220 can also select the requested transaction based on Quality of Service (QoS) characteristics of the cart 114, such as priority, timeliness, maximum latency, among others.

The de-queue module 220 can select a requested transaction from the requested transactions 224(1)-224(2) that corresponds to the item 204(1)-204(3) of the cart 214. For example, the de-queue module 220 can select a requested transaction 224(1) that corresponds to the item 204(1) prior to de-queueing the requested transaction 218(1) based on a required latency QoS characteristics of the cart 214 and the cart 114. The QoS characteristics of the cart 214 can have a shorter required latency for payment processing then the QoS characteristics of the cart 114.

In some embodiments, the transaction queue 216 can be implemented using multiple transaction queues. Each of the multiple transaction queues can store requested transactions for a different QoS level (i.e., a different level of a certain QoS characteristic), or be associated with a different group of buyers or sellers. For example, the transaction queue 216 can be associated with a first QoS level, and another queue (not shown) can be associated with a second QoS level. Each of the multiple transaction queues can be processed by a different processing module, such as described below with reference to FIG. 3. The de-queue module 220 can determine, based on QoS requirements associated with the cart 114, whether to select a first requested transaction from the transaction queue 216 or to select a second requested transaction from the another queue for de-queueing and payment processing.

The de-queue module 220 can de-queue a selected requested transaction from the transaction queue 216. The de-queue module 220 can also perform a transaction-level risk analysis on the selected requested transaction, such as on the de-queued requested transaction 218(1), to determine whether to process a payment for the selected requested transaction. The de-queue module 220 can communicate with the risk module 210 to obtain a transaction-level risk level for the selected requested transaction. The de-queue module 220 can compare the transaction-level risk level to a transaction threshold and determine whether to accept the selected requested transaction or not. Similar initial risk analysis can be performed on other requested transactions as they are de-queued. If the selected requested transaction is accepted, the de-queue module 220 can communicate the selected requested transaction to the payment module 222 for payment processing and optionally to initiate fulfillment of an order for the item that corresponds to the selected requested transaction.

In some embodiments, the de-queue module 220 and the transaction module 212 can access the transaction queue 216 in an asynchronous manner. The transaction module 212 can add requested transactions to the transaction queue 216. Independently of the transaction module 212, the de-queue module 220 can select and de-queue requested transactions from the transaction queue 216. The transaction module 212 can operate as a publisher of requested transactions to the transaction queue 216. The de-queue module 220 can operate as a subscriber of the requested transactions of the transaction queue 216. Example embodiments of asynchronous processing of requested transactions are described below with reference to FIGS. 3, 4, and 6-8.

In some embodiments, the de-queue module 220 and the transaction module 212 can access the transaction queue 216 in a synchronous manner. The transaction module 212 can add requested transactions to the transaction queue 216. The de-queue module 220 can then select and de-queue one of the requested transactions from the transaction queue 216. However, in the synchronous approach, the transaction module 212 and the de-queue module 220 can both access the transaction queue 216 in a blocking manner, e.g., the requested transaction can be processed by the transaction module 212 and then by the de-queue module before another requested transaction. Example embodiments of asynchronous processing of requested transactions are described below with reference to FIG. 5.

The payment system 112 can transmit notifications to the marketplace, the buyer, and/or sellers 108(1)-108(3) at various points of processing of the cart 114 and the requested transactions of the transaction queue 216. For example, the payment system 112 can send notifications to the user device 104 or the order generator 106 (i.e., the buyer of the cart 114), indicating that the entire cart 114 has been accepted or rejected. The payment system 112 can transmit similar notifications indicating the rejection the cart 114 to the sellers 108(1)-108(3) of the items 202(1)-202(3). Upon selection and de-queueing of one of the requested transactions 218(1)-218(4), 224(1), and 224(2), the payment system 112 can also transmit notifications to the buyer of the cart 114 to indicate that a payment for the item 202(1) corresponding to the selected requested transaction is being processed. Similar notifications can be transmitted to the seller 108(1) of the item 202(1), as well as to the marketplace 102. The payment system 112 can also transmit notifications to the buyer, the seller 108(2), and to the marketplace indicating that a next requested transaction has been rejected based on the second risk analysis.

The payment system 112 can configure the disbursement module 226 to determine when to disburse some of funds for purchasing the item based on associated disbursement signals. For example, the payment module 222 (or another module of the payment system 112) can configure the disbursement module 226 to select a source of a general disbursement signal that indicates a requested transfer of a first portion of funds from a buyer payment account at the payment system 112 to a general payment account at the payment system 112. For example, the payment module 222 can select the risk module 210 to be the source of the general disbursement signal. The risk module 210 can provide the general disbursement signal that can indicate results of a transaction-level risk analysis on a requested transaction for purchasing a certain item of the cart 114. The payment module 222 can also select another source at the payment system 112 that can indicate whether the buyer of the certain item has been pre-authorized for providing the funds for that item. The payment module 222 can also select a source that is external to the payment system 112, where the external source can indicate whether the buyer has passed additional risk analysis.

The general payment account can be a payment account at the payment system 112 that holds a balance of funds that is provided by the buyer for purchase of an item indicated by a respective requested transaction. The general payment account can hold multiple balances for multiple transactions. It is noted that the funds that are later disbursed for each transaction are not necessarily the same funds that were held in the general payment account. Instead, the funds that are disbursed (e.g., in response to receiving a certain disbursement signal) for each transaction are provided from the general payment account. In other words, the funds are not necessarily earmarked and associated with each transaction, and instead can be provided to, and provided from, a general pool of funds. The payment system 112 can implement the general payment account as a general ledger or as multiple ledgers (e.g., one per merchant, one per buyer). The payment system 112 can also implement the general payment account as a credit account for each buyer (i.e., that provides a credit balance to each buyer). The payment system 112 can hold the funds (or a balance) in the general payment account until the disbursement signal associated with that transaction is received.

The payment module 222 can configure the disbursement module 226 to determine a merchant disbursement event for transferring a second portion of the funds from the general payment account to a merchant payment account at the payment system. There are various types of merchant disbursement events, including events related to shipping of the item by the merchant (e.g., the seller 108(1)) or by the supplier 120, receiving of the item by the shipping agent 122, clearing of the item by the customs 126 when transported across country boundaries, and/or receiving of the item by the buyer. The payment module 222 can receive a request for a merchant disbursement event from the seller 108(1) or from the buyer. The requested merchant disbursement event can indicate that the merchant disbursement event to be of a certain type.

The merchant disbursement event can depend on shipping characteristics associated with the item. The shipping characteristics can indicate the shipping address, a preferred shipping agent (e.g., the shipping agent 122), a shipping method (e.g., priority, shipping insurance, etc.). The shipping characteristics can be indicated by the buyer and/or the seller 108(1).

The merchant disbursement event can depend on merchant characteristics associated with the merchant. The merchant characteristics can indicate seller's 108(1) country of residence, results of seller's 108(1) risk analyses, seller's 108(1) rating (e.g., as scored and kept by the marketplace 102, by the payment system 112, and/or social media), and/or financial data associated with the seller's 108(1) payment account at the payment system 112. The merchant characteristics can be indicated by the seller 108(1).

The merchant disbursement event can depend on buyer characteristics associated with the buyer. The buyer characteristics can indicate buyer's country of residence, results of buyer's risk analyses, buyer's rating (e.g., as scored and kept by the marketplace 102, by the payment system 112, and/or social media), and/or financial data associated with the buyer's payment account at the payment system 112.

The payment module 222 can select a source of the merchant disbursement signal based on the merchant disbursement event. The source can be selected from candidate sources that are associated with the merchant disbursement event. The candidate sources can be one or more of the buyer and the transaction partners, e.g., the supplier 120, the shipping agent 122, the receiving agent 124, and/or the customs 126. For example, if the merchant disbursement event is related to shipping of the item, the payment module can select the buyer to be the source of a merchant disbursement signal (e.g., that indicates that the item has been received by the buyer), or the shipping agent 122 to be the source of the merchant disbursement signal (e.g., that indicates that the item is being shipped by the shipping agent 122). The payment module 222 can select the source between the buyer and the shipping agent 122 based on the shipping and/or buyer characteristics, or based on a request from the buyer. The payment module 222 can assign weighting scores to each of candidate sources (e.g., the buyer and the shipping agent 122 in this example), and select the candidate source with the highest score. As described below, the payment module 222 can reconfigure the disbursement module 226 for another the merchant disbursement signal (e.g., such as by determining a different source) based on the same the merchant disbursement event. The payment module 222 can also reconfigure the disbursement module 226 for another the merchant disbursement signal based on a different merchant disbursement event.

In some embodiments, the payment module 222 can configure the disbursement module 226 to transfer the funds from the general payment account to the merchant payment account based on receiving a combination of disbursement signals. For example, the payment module 222 can configure the disbursement module 226 to perform the transfer of funds in response to receiving a disbursement signal from the customs 126 and from the shipping agent 122. One or more of the transaction partners can also have payment accounts at the payment system 112. However, it is not necessary for the transaction partners to have accounts at the payment system 112 in order for the payment system 112 to receive disbursement signals from that source.

In some embodiments, the payment module 222 can also configure the disbursement module 226 to disburse partner fees in response to receiving certain disbursement signals. A partner fee is a fee that can be provided by the payment system 112 to one of the transaction partners. For example, the disbursement module 226 can also provide a partner fee to the shipping agent 122 upon receiving a disbursement signal from the shipping agent 122 (e.g., indicating that a certain item has shipped). The disbursement module 226 can also provide a partner fee to the customs 126 upon receiving a disbursement signal from the customs 126 (e.g., indicating that a tariff is imposed on the certain item). The disbursement module 226 can also provide a partner fee to the receiving agent 124 upon receiving a disbursement signal from the receiving agent 124 and/or from the shipping agent 122 (e.g., indicating that a certain item was delivered).

Figure 3:
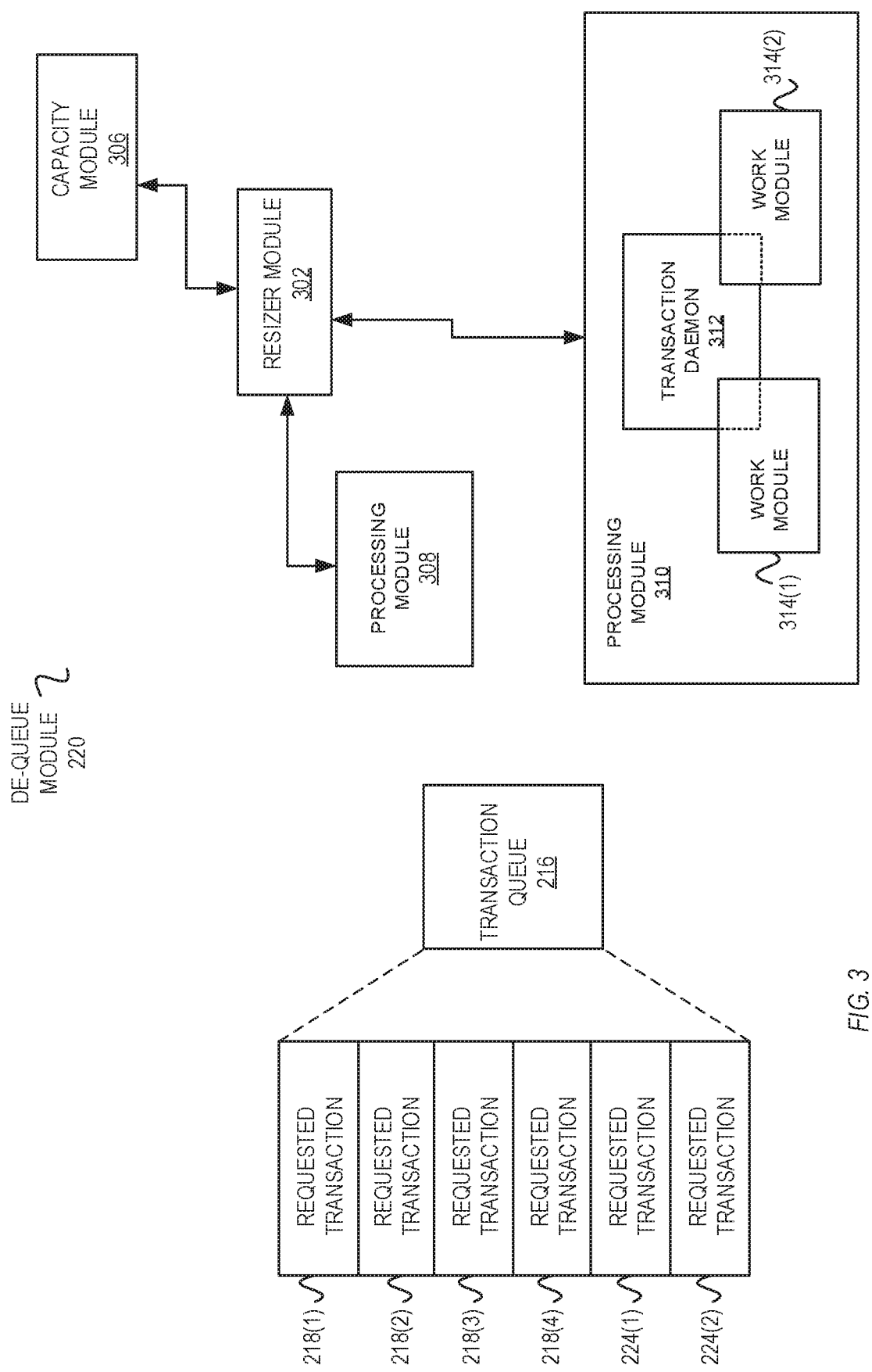
FIG. 3 is a system diagram illustrating embodiments of a de-queue module for accessing a transaction queue.

FIG. 3 is a system diagram illustrating embodiments of the de-queue module 220 for accessing the transaction queue 216. The de-queue module 220 includes a resizer module 302, a capacity module 306, and processing modules 308 and 310. The processing modules 308 and 310 can access the transaction queue 216. In one embodiment, the processing module 310 includes a transaction daemon 312 and work modules 314(1) and 314(2). The transaction queue 216 includes requested transactions 218(1)-218(4), 224(1), and 224(2), as described above with reference to FIG. 2. The processing modules 308 and 310 can access the transaction queue 216 in an asynchronous manner.

In some embodiments, each of the de-queue module 220 and the transaction module 212 can be implemented using separate software threads. The processing modules 308 and 310 can each be implemented as a software application or service. A service is a software application that can execute autonomously from other software applications. Each of the transaction daemons can be implemented as a separate software application or a separate software service.

The capacity module 306 can determine a queue capacity and/or a queue rate of the transaction queue 216. The queue capacity and the queue rate (as also described below with reference to FIG. 6) relate to characteristics of the transaction queue 216. The queue capacity indicates a capacity of the transaction queue 216 to store a certain number of requested transactions. The queue capacity can also indicate available queue capacity, which indicates how many additional requested transactions can be stored by the transaction queue 216. The queue rate indicates a rate at which additional requested transactions are added to the transaction queue 216. The queue rate is indicative of how many carts are received by the payment system 112 for processing.

If the available queue capacity of the transaction queue 216 is smaller than a threshold, then the de-queue module 220 can communicate with the transaction module 212 (or with another module that manages the size of the transaction queue 216) to increase the size of the transaction queue 216. In another embodiment, the de-queue module 220 can communicate with the transaction module 212 to create another transaction queue that can be used to add, de-queue, and process requested transactions. Similarly, if the available queue capacity of the transaction queue 216 is larger than a threshold, then the de-queue module 220 can communicate with the transaction module 212 to decrease the size of the transaction queue 216. The de-queue module 220 can also communicate with the transaction module 212 to delete (or de-activate) the another transaction queue.

The resizer module 302 can also determine de-queue rate/capacity, as well as processing rate/capacity of the processing modules 308 and/or 310. The resizer module 302 can also indicate a transaction rate, which can be based on the de-queue rate and the processing rate. The resizer module 302 can also indicate a transaction capacity, which can be based on the de-queue capacity and the processing capacity. The de-queue rate/capacity, processing rate/capacity, and transaction rate/capacity (as also described below with reference to FIG. 6) relate to characteristics of de-queueing and processing requested transactions from the transaction queue 216 and processed, and can be referred to as "downstream" characteristics of the de-queue module 220 and/or the transaction queue 216.

The de-queue rate indicates a rate at which requested transactions are selected and de-queued from the transaction queue 216. For example, the de-queue rate can be 5 requested transactions per millisecond (ms), which means that 5 requested transactions are selected and de-queued from the transaction queue 216 per each ms. The de-queue rate is indicative of how fast the processing module 308 can select and de-queue requested transactions from the transaction queue 216.

The de-queue capacity indicates a capacity of the processing module 308 and/or 310 to select and de-queue requested transactions from the transaction queue 216. The de-queue capacity may be indicative of how many requested transactions can be de-queued at the same time, or substantially in parallel. For example, if both the processing modules 308 and 310 each include two work modules, and each work module can select and de-queue one requested transaction from the transaction queue 216 at a time, then the de-queue capacity can have a value of 4.

The processing rate indicates a rate at which de-queued requested transactions are processed by the payment system 112. The processing rate indicates a rate at which the de-queued requested transactions are processed by the payment system 112, which includes performing the transaction-level risk analysis and payment processing by the payment module 222. The risk module 210 of the payment system 112 can perform a transaction-level risk analysis on the de-queued requested transaction to generate a transaction-level risk level. If the transaction-level risk level is lower than a certain threshold, the de-queued requested transaction can then be communicated to the payment module 222 for payment processing. The processing rate can similarly indicate an instantaneous processing rate and/or an average processing rate.

In some embodiments, each of the processing modules 308 and 310 can communicate de-queued requested transactions to a different portion of the risk module 210 and/or a different portion of the payment module 222. For example, the processing module 308 can communicate a first set of de-queued requested transactions to a first portion of the risk module 210, and the processing module 310 can communicate a second set of de-queued requested transactions to a second portion of the risk module 210.

The processing capacity indicates capacity of the processing module 308 and/or 310 to process the de-queued requested transactions. For example, the processing module 308 may communicate two de-queued requested transactions to the first portion of the risk module 210 to perform transaction-level risk analysis on two requested transactions at the same time. Similarly, the processing module 310 may communicate two different requested transactions to the second portion of the risk module 210 to perform transaction-level risk analysis. The processing capacity of the processing module 308 is dependent on how many requested transactions can be processed at the same time by the risk module 210 and the payment module 222. The processing rate and the processing capacity of the processing module 308 can both depend on the number and efficiency of processing modules that are being used by the de-queue module 220. In some embodiments, the processing capacity also indicates a local cache of the processing modules 308 and 310. The local cache can be used to store de-queued requested transactions before they are communicated to the risk module 210 and the payment module 222.

The resizer module 302 can resize the processing modules 308 and 310 to increase or decrease the processing rate. By expanding the processing modules 308 and 310, the resizer module 302 can increase the processing rate. The resizer module can expand the processing module by creating or instantiating a new processing module, or by activating an inactive processing module. The new processing module can include a new transaction daemon and one or more new work modules, similar to that of the processing module 310. The new processing module can access the transaction queue 216 and also interface with the risk and payment modules 210 and 222. Expanding the processing module can also include increasing the number of work modules in an existing and active processing module. For example, the resizer module 302 can instantiate new work modules or activate inactive work modules.

The resizer module 302 can reduce the processing modules by removing one of the processing modules 308 or 310. Reducing the processing modules can include not using one of the processing modules 308 or 310, destroying one of the processing modules 308 or 310, and/or deactivating one of the processing modules 308 or 310. Reducing the processing module can also include decreasing the number of work modules in a certain processing module. For example, the resizer module 302 can de-instantiate or de-activate active work modules of the processing module 310.

The resizer module 302 can adjust operation of the processing modules 308 and 310, such as by pausing or un-pausing the processing modules 308 and 310. The resizer module 302 can pause or un-pause the processing modules 308 and 310 to decrease or increase the de-queue rate, respectively. By pausing operation of the processing module 310, the resizer module 302 can limit the de-queue rate at which the de-queue module 220 selects and de-queues requested transactions from the transaction queue 216. Similarly, by un-pausing operation of the processing module 310, the resizer module 302 increases the de-queue rate.

Figure 4:
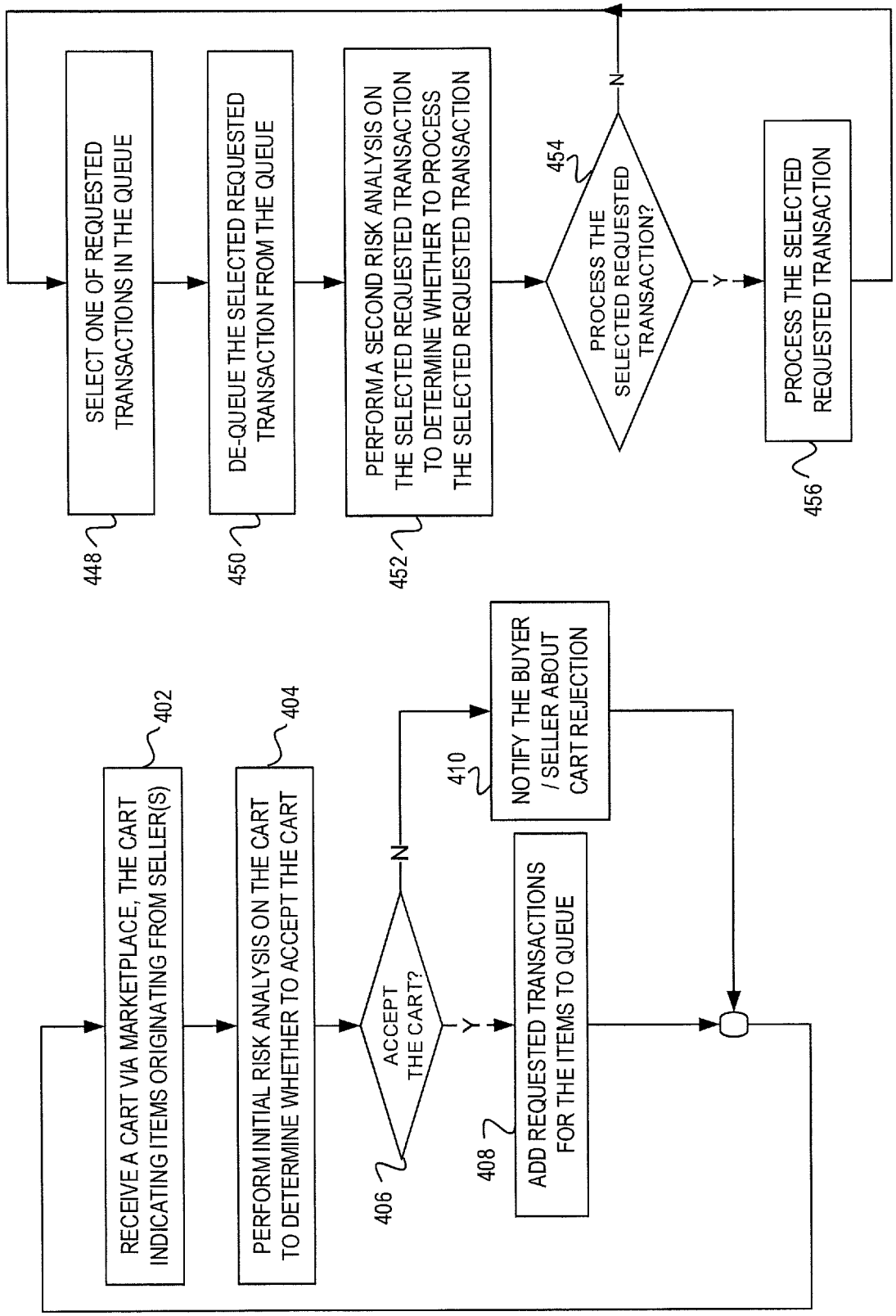
FIG. 4 is a flow diagram illustrating embodiments of operations for asynchronously accessing a transaction queue to process the requested transactions.

FIG. 4 is a flow diagram illustrating embodiments of operations for asynchronously accessing a transaction queue to process the requested transactions. The method of FIG. 4 is described with reference to the systems and components described in FIGS. 1-3 (for illustration purposes and not as a limitation). The example operations can be carried out asynchronously by the payment system 112. In some embodiments, elements 402-410 can be performed by the transaction module 212, while elements 448-456 can be performed by the de-queue module 220.

Beginning with 402, the payment system 112 receives a cart, via a marketplace, the cart indicating items originating from the sellers. For example, the transaction module 212 can receive the cart 114 that indicates items 202(1)-202(3) originating from sellers 108(1)-108(3). The cart 114 can have associated QoS characteristics indicating required QoS levels for requested transactions corresponding to the items 202(1)-202(3).

At 404, the payment system 112 performs an initial risk analysis on the cart 114 to determine whether or not to accept the cart 114. The initial risk analysis is a cart-level analysis that is performed by the risk module 210, such as to generate an initial risk level for the cart 114. The risk module 210 can transmit the initial risk level to the transaction module 212.

At 406, the payment system 112 determines whether to accept the cart 114. For example, the transaction module 212 can compare the initial risk level to a threshold. If the payment system determines to accept the cart, e.g., if the initial risk level has a value that is smaller than the threshold, the payment system 112 performs element 408 next. If the initial risk level has a value that is greater than the threshold, the payment system 112 performs element 410 next.

At 408, the payment system 112 adds requested transactions for the items 202(1)-202(3) of the cart 114 to the transaction queue 216. The requested transactions 218(1)-218(3) for the items 202(1)-202(3) can include requests to purchase each of these items, such as by the buyer of the cart 114.

At 410, the payment system 112 can notify the buyer and/or the seller about the cart rejection. For example, the payment system 112 can send a notification to the user device 104 (i.e., a buyer of the orders of the cart 114), indicating that the entire cart 114 has been rejected. The payment system 112 can transmit a similar notification of the rejection to the sellers 108(1)-108(3) of the items 202(1)-202(3).

The payment system 112 can receive, from the marketplace, another communication indicating that a new item is to be added to the cart 114. The payment system 112 can determine whether to add the new item to the transaction queue 216 depending on when the new item is added to the cart 114. In one case, the new item can be added to the cart 114 prior to the payment system performing the initial risk analysis for the cart 114. In this case, the payment system 112 can perform the initial risk analysis for the cart 114 that includes the new item (also referred to as an updated cart). A requested transaction 218(4) can then be added to the requested transactions 218(1)-218(3) already stored by the transaction queue 216.

In another case, the new item can be added to the cart 114 after the payment system 112 performs the initial risk analysis (i.e., the cart-level risk analysis) on the cart 114 (i.e., after element 404 is performed) but before any requested transactions 218(1)-218(3) are de-queued. The payment system 112 can perform the initial risk analysis on the new item to determine whether to accept the updated cart. Alternatively, the payment system 112 can redo the initial risk analysis on the entire updated cart (i.e., the cart 114 that includes the new item) to determine whether to accept the updated cart. In either implementation, in response to determining to accept the updated cart based on the additional initial risk analysis, the payment system 112 can add a new requested transaction 218(4) for the new item to the transaction queue 216 as part of the requested transactions 218(1)-218(3) of the cart 114.

In either implementation, in response to determining not to accept the updated cart based on the additional initial risk analysis, the payment system 112 can either simply not add the new requested transaction for the new item to the transaction queue 216, or reject the entire updated cart. The payment system 112 can determine whether to reject the new item or the entire updated cart based on configuration settings of the payment system 112, or on whether the new item is related to, or is a necessary portion of, the remaining items in the cart 114. For example, if the payment system 112 determines that the new item (e.g., a bicycle frame) is an integral part of the order of the items 202(1)-202(3) (e.g., bicycle parts), the payment system 112 can reject the entire updated cart. If the new part is unrelated to, or not a necessary portion of, the rest of the cart 114, the payment system can reject the new item.

In another case, the new item can be added to the cart 114 after the payment system 112 performs the initial risk analysis on the cart 114 and after at least one of the requested transactions 218(3)-218(4) for the cart 114 are selected and de-queued by the de-queue module 220. The payment system 112 can determine whether any or all of the requested transactions 218(1)-218(3) of the cart 114 are de-queued from the transaction queue 216.

In one embodiment, if any of the requested transactions 218(1)-218(3) of the cart 114 to which the new item is being added are de-queued, the addition of the requested transaction for the new item is denied by the payment system 112. In another embodiment, the new requested transaction for the new item can be added to the transaction queue 216 if not all requested transactions 218(1)-218(3) of the cart 114 are de-queued from the transaction queue 216.

At 448, the payment system 112 selects a requested transaction for de-queueing. The de-queue module 220 can select one of the requested transactions 218(1)-218(4), 224(1), and 224(2) of the transaction queue 216 based on a variety of criteria. The de-queue module 220 can select a requested transaction that corresponds to an item in the same cart as a requested transaction that was previously selected and processed (e.g., in the most immediately previous iteration of the elements 450-456). The de-queue module 220 can select a requested transaction that corresponds to an item from the same seller, or from the same buyer, as one of the requested transactions that was previously de-queued.

The de-queue module 220 can determine the QoS levels of certain QoS characteristics for the carts 114 and 214, and select, from the transaction queue 216, the requested transaction that has the QoS level with the highest priority. The de-queue module 220 can also select the oldest requested transaction (e.g., that was added first out of the requested transactions 218(1)-218(4), 224(1), and 224(2)), or select the newest requested transaction (e.g., that was most recently added to the transaction queue 216).

At 450, the payment system 112 de-queues the selected requested transaction from the transaction queue 216. FIG. 4 illustrates how the de-queue module 220 can asynchronously access the transaction queue 216, i.e., independently of the transaction module 212. At 452, the payment system 112 performs a second risk analysis on the selected requested transaction to determine whether to process the requested transaction. The second risk analysis is a transaction-level analysis that generates a transaction-level risk level for the selected requested transaction.

At 454, the payment system 112 determines whether to process the selected requested transaction. For example, if a value of the transaction-level risk level is smaller than a certain threshold, the payment system 112 can determine to process the selected requested transaction. If the payment system 112 determines to process the selected requested transaction, the selected requested transaction is processed at 456. Otherwise, the flow continues at 450. If the payment system 112 determines not to process the selected requested transaction, the payment system 112 can discard the selected requested transaction that was de-queued at 450, and select and de-queue a next requested transaction from the transaction queue 216.

Figure 5:
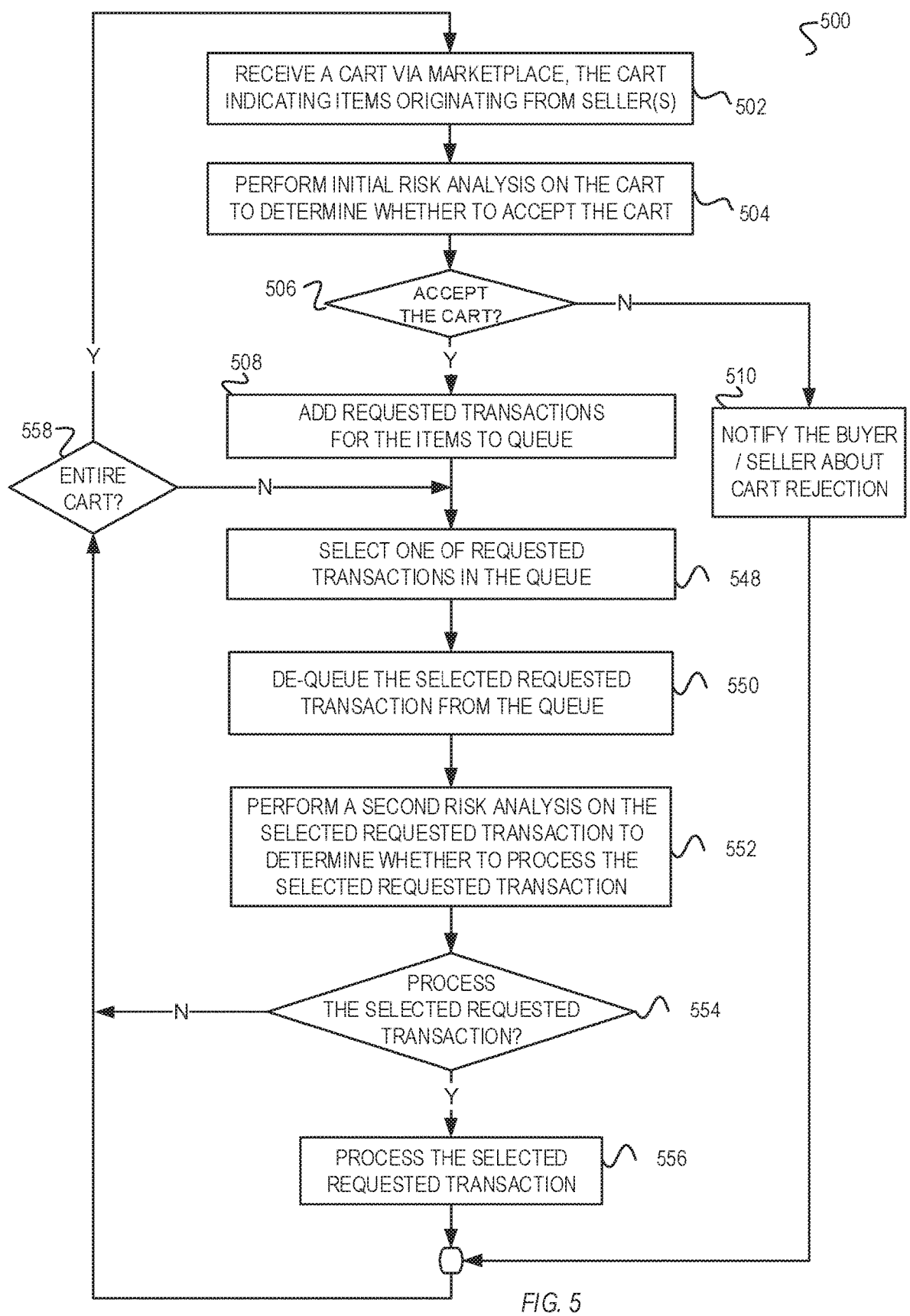
FIG. 5 is a flow diagram illustrating embodiments of operations for synchronously accessing a transaction queue to process the requested transactions.

FIG. 5 is a flow diagram 500 illustrating embodiments of operations for synchronously accessing the transaction queue 216 to process the requested transactions. The method of FIG. 4 is described with reference to the systems and components described in FIGS. 1-3 (for illustration purposes and not as a limitation). The example operations can be carried out asynchronously by the payment system 112. In some embodiments, elements 502-510 can be performed by the transaction module 212, while elements 548-558 can be performed by the de-queue module 220. The method of FIG. 5 is similar to that shown by FIG. 4, with some variations to illustrate different embodiments, or different aspects of particular embodiments. For example, the method of FIG. 4 is directed to asynchronous execution, whereas the method of FIG. 5 is directed to synchronous execution.

Beginning with 502, the payment system 112 receives a cart, via a marketplace. The element 502 is similar to the element 402. At 504, the payment system 112 performs an initial risk analysis on the cart 114 to determine whether or not to accept the cart 114. The element 504 is similar to the element 404. At 506, the payment system 112 determines whether to accept the cart 114. The element 506 is similar to the element 406. At 508, the payment system 112 adds requested transactions for the items 202(1)-202(3) of the cart 114 to the transaction queue 216. The element 508 is similar to the element 408. At 510, the payment system 112 can notify the buyer and/or the seller about the cart rejection. The element 510 is similar to the element 410.

At 548, the payment system selects a requested transaction from the transaction queue 216. The de-queue module 220 can select one of the requested transactions 218(1)-218(4). Thus, the de-queue module 220 can select a requested transaction that corresponds to an item in the same cart that was processed at elements 502-508. At 550, the payment system 112 de-queues the selected requested transaction from the transaction queue 216. The element 550 is similar to the element 450.

At 552, the payment system 112 performs a second risk analysis on the selected requested transaction to determine whether to process the requested transaction. The element 552 is similar to the element 452. At 554, the payment system 112 determines whether to process the selected requested transaction. If the payment system 112 determines to process the selected requested transaction, the selected requested transaction is processed at 556. Otherwise, the flow continues at 558. If the payment system 112 determines not to process the selected requested transaction, the payment system 112 can discard the selected requested transaction that was de-queued at 550. At 558, the payment system 112 determines whether the requested transactions for the entire cart 114 were processed. If the payment system 112 determines that the requested transactions for the entire cart 114 were processed, the payment system 112 continues to accept another cart at 502. Otherwise, the flow continues at 548, where the payment system 112 can select a next requested transaction of the cart 114 from the transaction queue 216.

Figure 6:
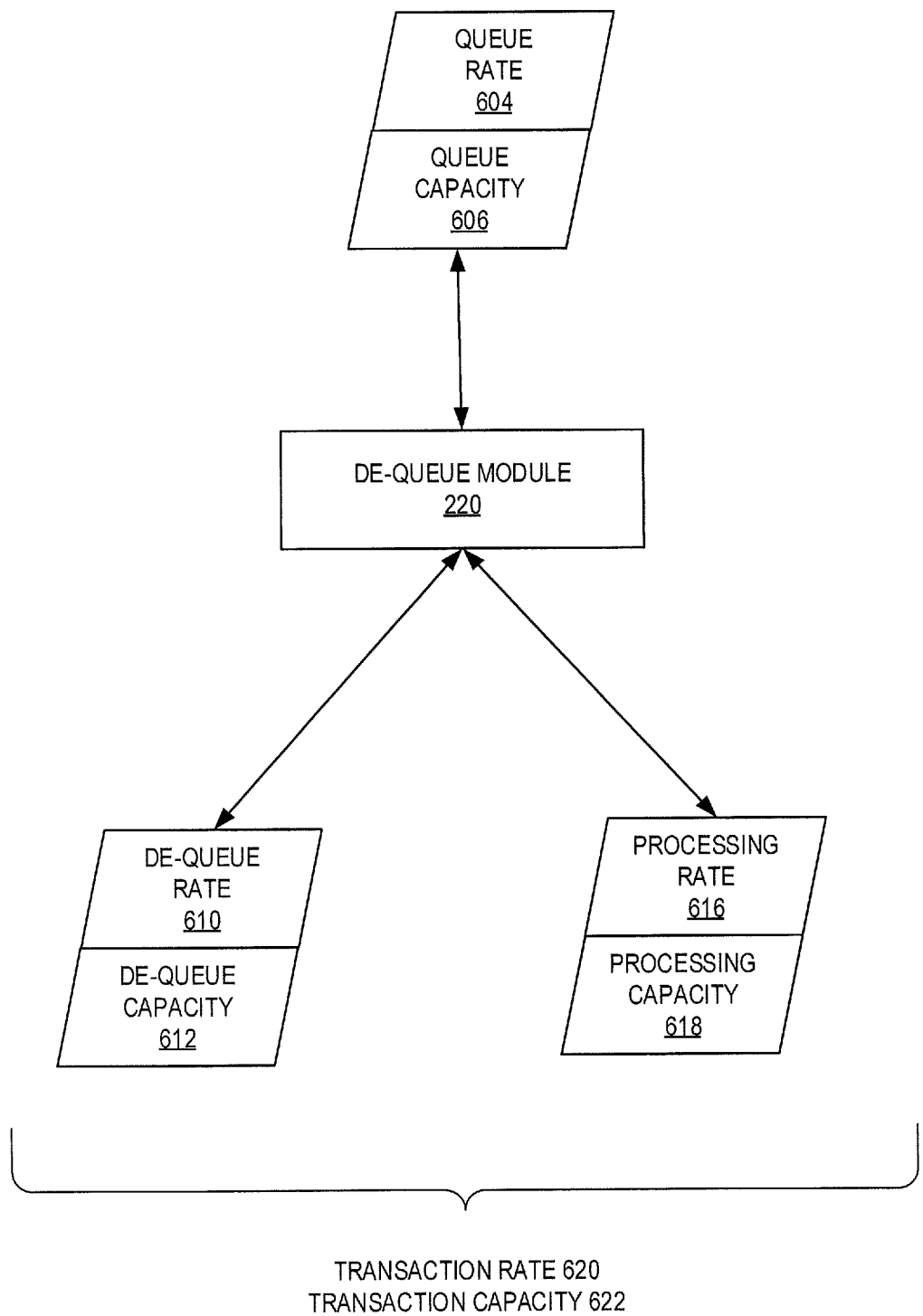
FIG. 6 is a diagram illustrating embodiments of characteristics of a transaction queue and processing modules used by the de-queue module to manage access to a transaction queue.

FIG. 6 is a diagram illustrating embodiments of characteristics of a transaction queue and processing modules used by the de-queue module to manage access to a transaction queue. As also discussed above with reference to FIG. 3, the capacity module 306 can determine a queue rate 604 and/or a queue capacity 606 of the transaction queue 216. The queue capacity 606 and the queue rate 604 relate to characteristics of how requested transactions are being added to the transaction queue 216. The queue capacity 606 and the queue rate 604 can be referred to as "upstream" characteristics of the transaction queue 216. For example, the queue capacity 606 of the transaction queue 216 can be '100', which indicates that the transaction queue 216 can store 100 requested transactions at one time. The queue capacity 606 is thus dependent on the size of the transaction queue 216.

The queue capacity 606 can also indicate available queue capacity, which indicates how many additional requested transactions can be stored by the transaction queue 216. As requested transactions can be de-queued from the transaction queue 216 and processed by the processing modules 308 and/or 310, the available queue capacity can indicate an instantaneous available queue capacity for capacity of the transaction queue 216. The instantaneous available queue capacity can indicate available queue capacity at a certain point-in-time, such as at a time the capacity module 306 checks for available queue capacity, or at a time specified by the capacity module 306. The available queue capacity can also indicate an average available queue capacity for an average capacity of the transaction queue 216, such as over the past 3 seconds, or it may also indicate another available capacity of the transaction queue 216.

The queue rate 604 indicates a rate at which additional requested transactions are added to the transaction queue 216. For example, the queue rate 604 can be 5 requested transactions per millisecond (ms), which means that 5 new requested transactions are added to the transaction queue 216 per each ms. The queue rate 604 can indicate an instantaneous queue rate and/or an average queue rate. The instantaneous queue rate can indicate queue rate at a certain point-in-time, such as at a time the capacity module 306 checks for queue rate, or at a time specified by the capacity module 306. The average queue rate can indicate an average rate that requested transactions are added to the transaction queue 216.

The de-queue rate 610 indicates a rate at which requested transactions are selected and de-queued from the transaction queue 216. For example, the de-queue rate 610 can be 5 requested transactions per millisecond (ms), which means that 5 requested transactions are selected and de-queued from the transaction queue 216 per each ms. The de-queue rate 610 can similarly indicate an instantaneous de-queue rate and/or an average de-queue rate.

The de-queue capacity 612 indicates capacity of the processing module 308 and/or 310 to select and de-queue requested transactions from the transaction queue 216. The de-queue capacity 612 may be indicative of how many requested transactions can be de-queued at the same time, or substantially in parallel. The de-queue capacity 612 can similarly indicate an instantaneous de-queue capacity and/or an average de-queue capacity.

The processing rate 616 indicates a rate at which de-queued requested transactions are processed by the payment system 112. The processing rate 616 can similarly indicate an instantaneous processing rate and/or an average processing rate. The processing capacity 618 indicates capacity of the processing module 308 and/or 310 to process the de-queued requested transactions. The processing capacity 618 is described above with reference to FIG. 3. The processing capacity 618 can similarly indicate an instantaneous processing capacity and/or an average processing capacity.

The transaction rate 620 is based on the de-queue rate 610 and the processing rate 616. The transaction rate 620 can indicate a rate at which the de-queue module 220 can de-queue requested transactions and also a rate at which the requested transactions can be processed at the same time by the risk module 210 and the payment module 222. The transaction rate 620 can similarly indicate an instantaneous transaction rate and/or an average transaction rate.

The transaction capacity 622 is based on the de-queue capacity 612 and the processing capacity 618. The transaction capacity 622 can indicate how many requested transactions can be de-queued at the same time, or substantially in parallel, and also how many requested transactions can be processed at the same time by the risk module 210 and the payment module 222. The transaction capacity 622 can similarly indicate an instantaneous transaction capacity and/or an average transaction capacity.

Figure 7:
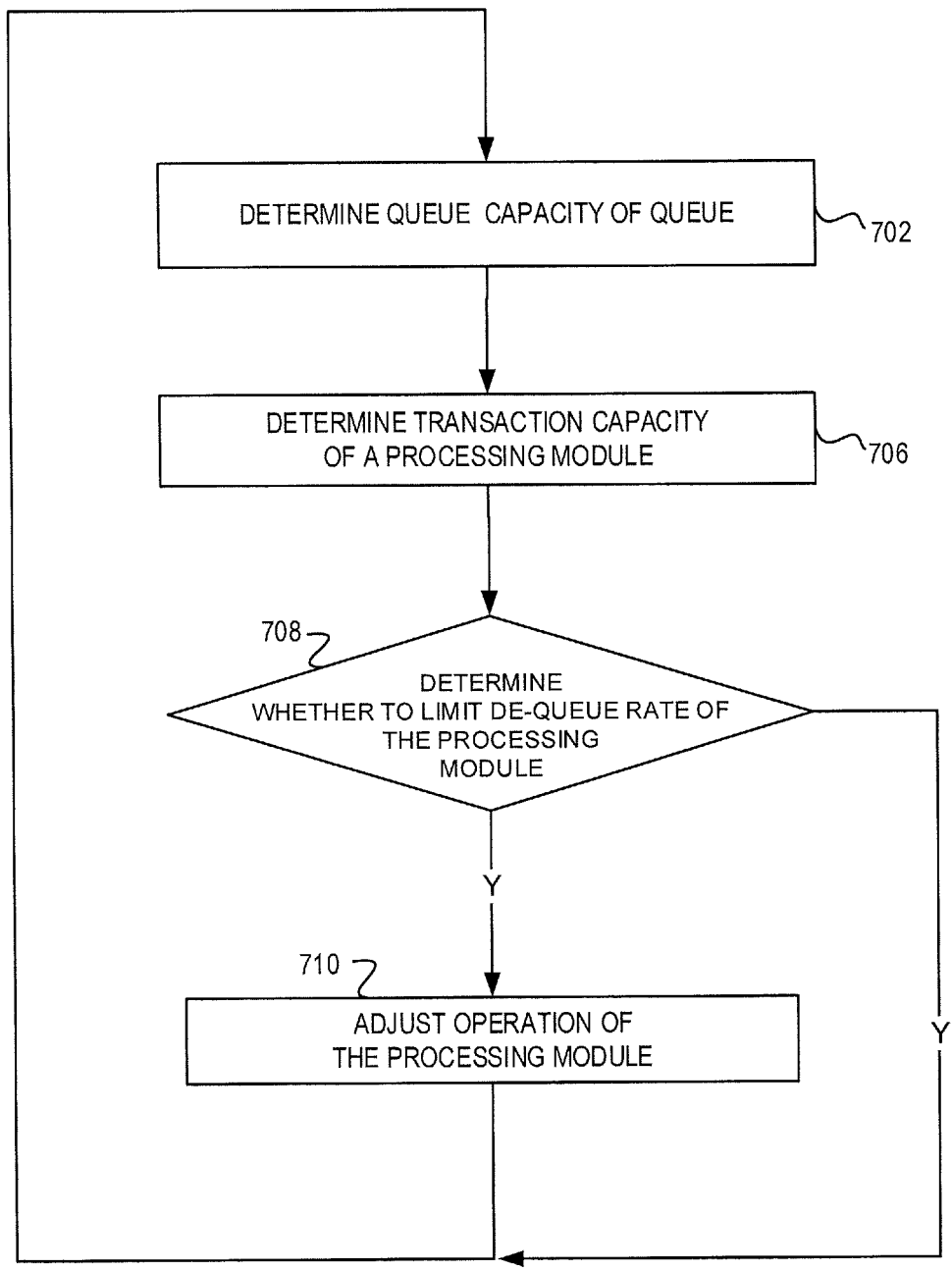
FIG. 7 is a flow diagram illustrating embodiments of operations for adjusting operation of a processing module of a de-queue module that accesses the transaction queue.

FIG. 7 is a flow diagram illustrating embodiments of operations for adjusting operation a processing module of a de-queue module that accesses the transaction queue. The method of FIG. 7 is described with reference to the systems and components described in FIGS. 1-3 (for illustration purposes and not as a limitation). The example operations can be carried out asynchronously by the payment system 112. In some embodiments, elements 702-710 can be performed by the de-queue module 220, such as by the resizer module 302. FIG. 7 is directed to managing queue capacity and queue rate, which can be referred to as "upstream" characteristics of the transaction queue 216.

Beginning with 702, a de-queue module determines a queue capacity of a queue. For example, the resizer module 302 of the de-queue module 220 can determine the queue capacity of the transaction queue 216.

At 706, the de-queue module determines a transaction capacity of a processing module. For example, the resizer module 302 can determine the transaction capacity of the processing module 308 and/or the processing module 310. The transaction capacity can indicate a backlog of a portion of the requested transactions at the processing module 308 and/or the processing module 310. For example, the resizer module 302 can determine that there is a backlog of requested transactions at the processing module 308, such as due to a delay in processing of the requested transactions by the risk module 210 and/or by the payment module 222.

At 708, the de-queue module determines whether to limit a de-queue rate of the processing module. For example, the resizer module 302 can determine, based on the queue capacity and on the transaction rate whether to limit the de-queue rate of the processing modules of the de-queue module 220. Depending on an amount of the de-queue rate to be limited, the resizer module 302 can determine to limit the de-queue rate of one or both of the processing modules 308 and 310. The resizer module 302 can also determine whether to limit the de-queue rate of a portion of one of the processing modules 308 and 310.

The de-queue module 220 can determine whether to limit the de-queue rate based a determination of an available queue capacity of the transaction queue 216 that indicates a capacity to store additional requested transactions. The de-queue module 220 can also determine whether to limit the de-queue rate based on whether the backlog of the requested transactions at the processing module 308 and/or the processing module 310 is larger than a certain threshold.

The de-queue module 220 can also determine a transaction rate of the processing module 308. The de-queue module 220 can also access a queue rate (such as from the transaction module 212) at which additional requested transactions are added to the transaction queue 216. The de-queue module 220 can determine whether to limit the de-queue rate based on whether the queue rate is larger than the transaction rate. The de-queue module 220 can also access a transaction log that indicates how many requested transactions were added to the transaction queue over a certain amount of time, or during a known spike in orders (such as due to a known sale). The de-queue module 220 can also determine whether to limit the de-queue rate based on analysis of the transaction log.

In one implementation, the de-queue module 220 modifies the de-queue rate based on the queue rate, such to keep the available queue capacity of the transaction queue 216 at a constant level. In one implementation, the de-queue module 220 can also determine that the available capacity of the transaction queue 216 is large enough (e.g., it is larger than a certain threshold) such that the transaction queue 216 can accept additional requested transactions. By limiting the de-queue rate of the processing module 308, the de-queue module 220 is decreasing a rate at which requested transactions are communicated to the risk module 210 and/or the payment module 222 for processing. Thus, by limiting the de-queue rate of the processing module 308, a backlog of a portion of the requested transactions is decreased. The backlog can include the portion of the requested transactions that is being processed at the processing module 308, the processing module 310, the risk module 210, and/or the payment module 222.

The de-queue module 220 can determine an updated queue capacity of the transaction queue 216. The updated queue capacity indicates a capacity of the transaction queue 216 to store a certain number of additional requested transactions. The de-queue module 220 can also determine an updated transaction capacity of the processing module 308 and/or 310. The updated transaction capacity indicates a capacity of the processing module 308 and/or 310 to process a number of the additional requested transactions. The resizer module 302 of the de-queue module 220 can determine, based on the updated queue capacity and on the updated transaction capacity, whether to increase the de-queue rate. In response to determining to increase the de-queue rate, the resizer module 302 can adjust the operation of the processing module. For example, once the de-queue module 220 determines that the backlog of a portion of the requested transactions is decreased, such as below a certain threshold, then the de-queue module can increase the de-queue rate.

At 710, the de-queue module adjusts operation of the processing module. For example, in response to determining to limit the de-queue rate of the processing module 308, the resizer module 302 can pause the operation of the work module 314(1) of the processing module 310. In another example, the resizer module 302 can pause the operation of the entire processing module 310.

Figure 8:
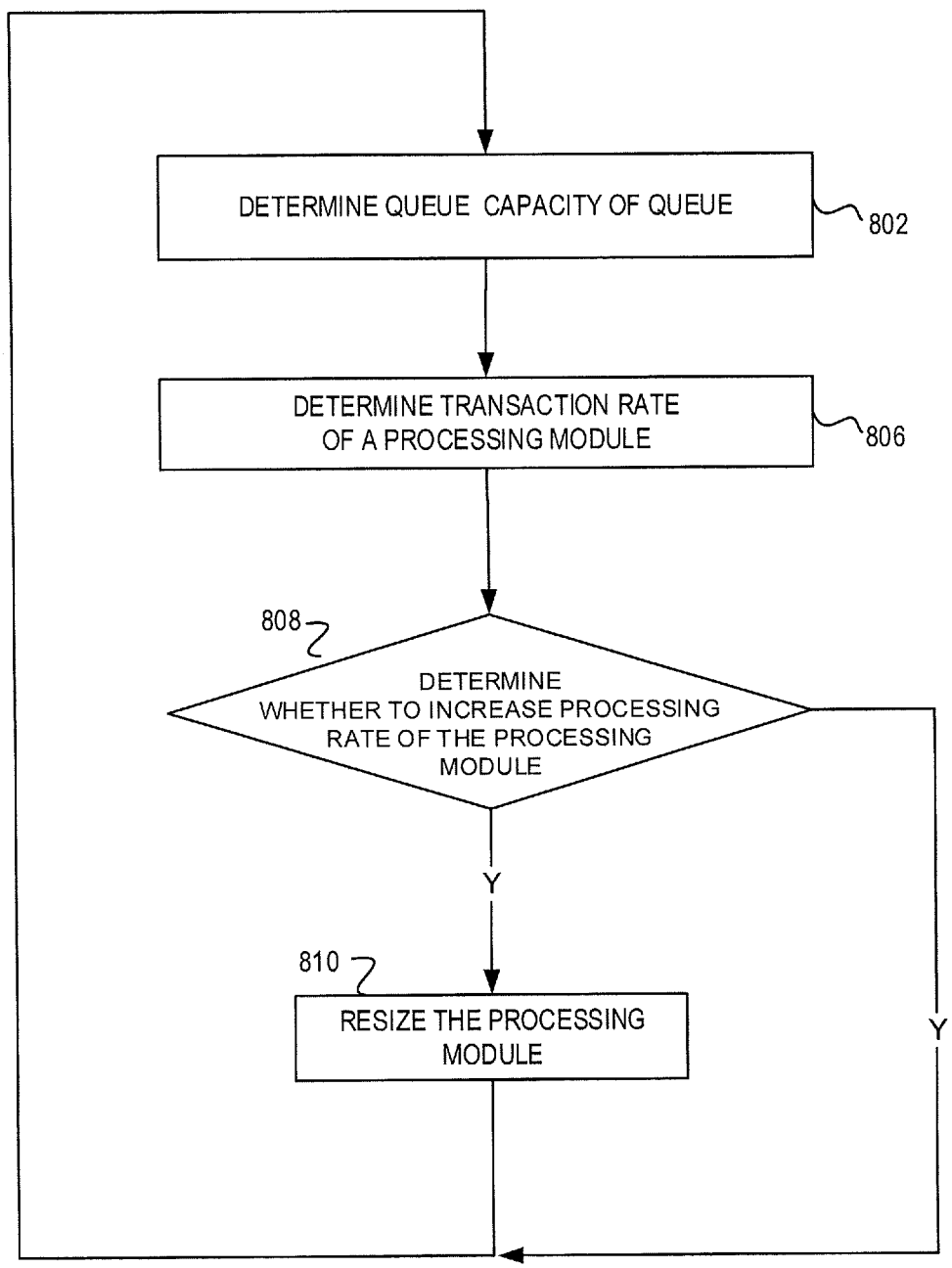
FIG. 8 is a flow diagram illustrating embodiments of operations for resizing a processing module of a de-queue module that accesses the transaction queue.

FIG. 8 is a flow diagram illustrating embodiments of operations for resizing a processing module of a de-queue module that accesses a transaction queue. The method of FIG. 8 is described with reference to the systems and components described in FIGS. 1-3 (for illustration purposes and not as a limitation). The example operations can be carried out asynchronously by the payment system 112. In some embodiments, elements 802-810 can be performed by the de-queue module 220. FIG. 8 is directed to managing "downstream" characteristics of the transaction queue 216.

Beginning with 802, a de-queue module determines a queue capacity of a queue. The element 802 is similar to element 702. At 806, the de-queue module determines a transaction rate of the processing module. For example, the resizer module 302 can determine the transaction rate of the processing module 308 and/or the processing module 310. The transaction rate can indicate a rate at which the requested transactions are de-queued from the transaction queue 216 by the processing modules 308 and 310, and then transmitted to the risk module for processing.

At 808, the de-queue module determines whether to increase processing rate of the processing module. For example, the resizer module 302 can determine, based on the queue capacity and the transaction rate, whether to increase the processing rate of one or both of the processing modules 308 and 310. The resizer module 302 can determine whether to increase the processing rate based also on the transaction capacity of the transaction queue 216, and/or whether the queue rate of the transaction queue 216 is larger than the transaction rate. The resizer module 302 can determine whether to resize the transaction daemon 312.

The de-queue module 220 can also forecast a transaction spike indicating that additional requested transactions are to be added to the transaction queue 216. The resizer module 302 can determine whether to increase the processing rate based also on whether the processing modules 308 and/or 310 can process the additional requested transactions of the transaction spike. A transaction spike can occur if multiple buyers generated carts using the marketplace 102, and submitted all of these carts at one time. The spike in cart submission can be due to a sale or another event at the marketplace 102, e.g., that motivates the buyers to store and wait on submitting the carts until the time of a known sale. The de-queue module 220 can forecast (e.g., weeks in advance) transaction spikes for known sales by the sellers 108(1)-108(3) of the marketplace 102.

Before the processing module 310 is resized, the processing module 310 can transmit selected de-queued requested transactions to the risk module 210 by communicating with a first portion of the risk module 210. After the processing module 310 is resized, the resized processing module 310 can transmit additional de-queued requested transactions to a second portion of the risk module 210.

At 810, the de-queue module resizes the processing module. For example, in response to determining to increase the processing rate of the processing module 310, the resizer module 302 resizes the processing module 310. The resizer module 302 can resize the transaction daemon 312 by a resizing factor to change a number of the work modules 314(1) and 314(2).

Figure 9:
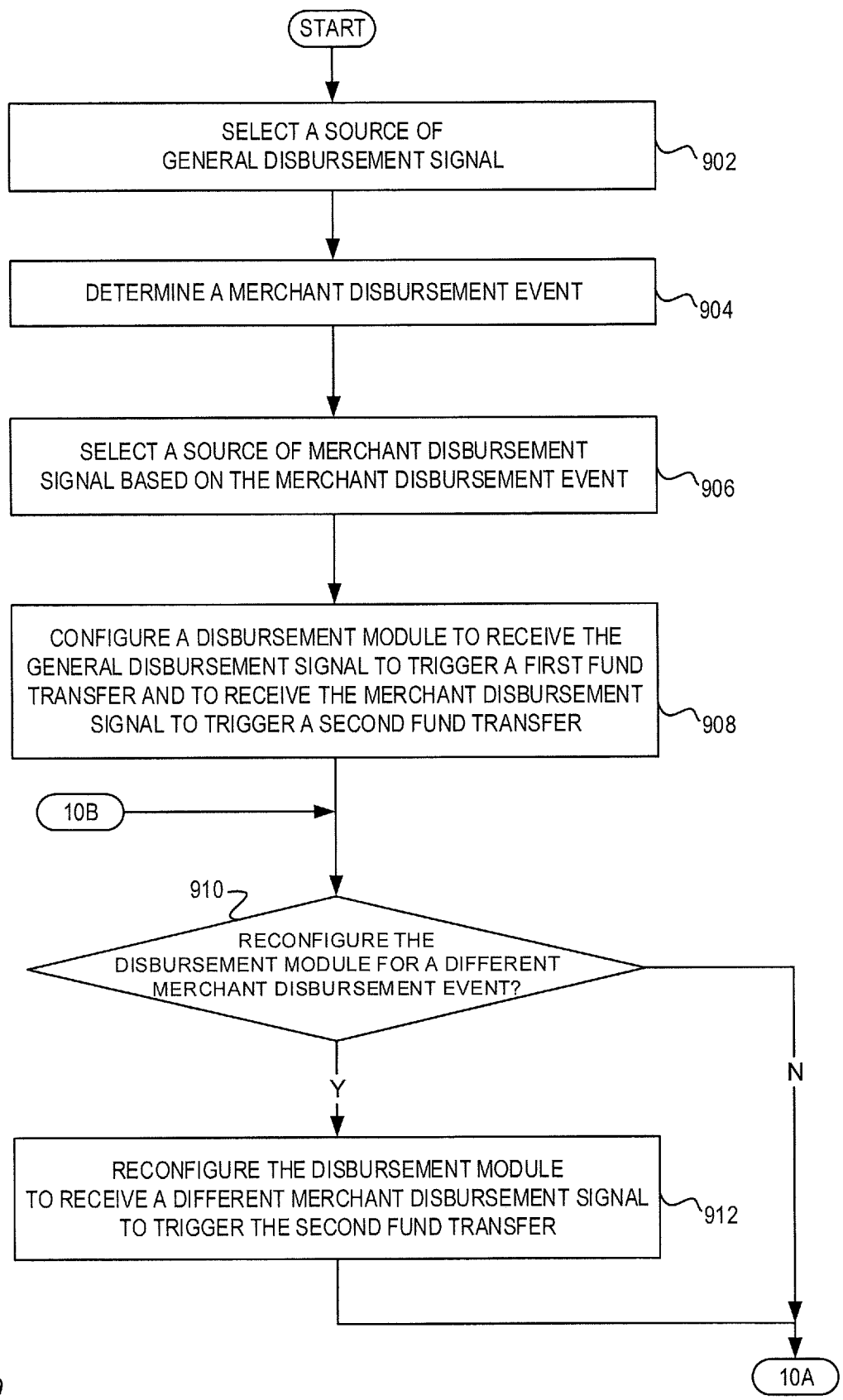
FIG. 9 is a flow diagram illustrating embodiments of operations for configuring a disbursement module for managing disbursement signals.

FIG. 9 is a flow diagram illustrating embodiments of operations for configuring a disbursement module for managing disbursement signals. The method of FIG. 9 is described with reference to the systems and components described in FIGS. 1-3 (for illustration purposes and not as a limitation). The example operations can be carried out by the payment system 112. In some embodiments, elements 902-912 can be performed by the payment module 222.

Beginning with 902, a payment system selects a source of a general disbursement signal. For example, the payment module 222 of the payment system 112 can select a source, such as the risk module 210, of the general disbursement signal. The general disbursement signal can indicate a requested transfer of a first portion of funds from a buyer payment account to a general payment account. The first portion of the funds is for purchasing an item of the cart 114 from a merchant (e.g., the seller 108(1)) via the marketplace 102.

At 904, the payment system determines a merchant disbursement event. For example, the payment module 222 can determine the merchant disbursement event for transferring a second portion of the funds from the general payment account to the merchant payment account.

The payment system can determine shipping characteristics associated with the item and/or determine merchant characteristics associated with the merchant. The payment system can determine the merchant disbursement event based on the shipping characteristics and/or the merchant characteristics. The payment system can determine the merchant disbursement event based on the regulations for the country to which the item is being shipped. For example, the payment system can determine the merchant disbursement event to be an expiration of a certain number of days after receipt of the general disbursement signal, as required by the regulations.

The payment system can receive a request for a merchant disbursement event, such as from the merchant or from the buyer. The payment system can determine, based on the merchant characteristics and the shipping characteristics, whether the requested merchant disbursement event is acceptable. The requested merchant disbursement event can be found not to be acceptable if a certain country to which the item is being shipped has regulations demanding a different merchant disbursement event. For example, the requested merchant disbursement event can indicate a disbursement of the second portion of funds upon shipping of the item by the supplier or by the merchant. However, the regulations for the country to which the item is being shipped (i.e., where the buyer and/or receiving agent are located) may require that only merchant disbursement events of the buyer and/or receiving agent receiving the item are acceptable. In another example, the regulations for the country to which the item is being shipped require that the second portion of funds is disbursed to the merchant after an expiration of a certain number of days. If the payment system determines that the requested merchant disbursement event is not acceptable, the payment system can modify the requested merchant disbursement event to one that is acceptable.

At 906, the payment system selects a source of the merchant disbursement signal based on the merchant disbursement event. For example, the payment module 222 can select a source for the merchant disbursement signal that indicates a requested transfer of the second portion of the funds from the general payment account to the merchant payment account. If the merchant disbursement event is related to shipping of the item, the merchant disbursement signal can include a notification from a buyer of the item that the item has been received, or a notification from a shipping agent that the item has been shipped. If the merchant disbursement event is an expiration of a certain number of days after receipt of the general disbursement signal, as required by the regulations, then the merchant disbursement signal can be a determination that the predetermined number of days has lapsed after the receipt of the general disbursement signal.

At 908, the payment system configures the disbursement module to trigger the first fund transfer of the first portion of the funds in response to receiving the general disbursement signal from the first source and to trigger a second fund transfer of the second portion of the funds in response to receiving the merchant disbursement signal from the second source. For example, the payment module 222 can configure the disbursement module 226 to trigger the first fund transfer and the second fund transfer in response to receiving the general disbursement signal and the merchant disbursement signal, respectively.

The payment module 222 can configure the disbursement module 226 to trigger the first fund transfer based on a determination that additional general disbursement signals associated with additional items of the cart 114 are also received. The disbursement module 226 can thus be configured to receive general disbursement signals for all of the items in the cart 114, where each item can originate at a different merchant, prior to triggering the first fund transfer.

The payment module 222 can also determine, based on the merchant disbursement signal and on a type of the second source, whether a marketplace fee is to be transferred from the general payment account or from the merchant payment account. The marketplace fee is a fee that can be disbursed to the marketplace 102 for each cart or transaction of the cart for which fund transfers are processed. The payment module 222 can then configure the disbursement module 226 transfer the marketplace fee from the general payment account or from the merchant payment account, per the determination.

Figure 10:
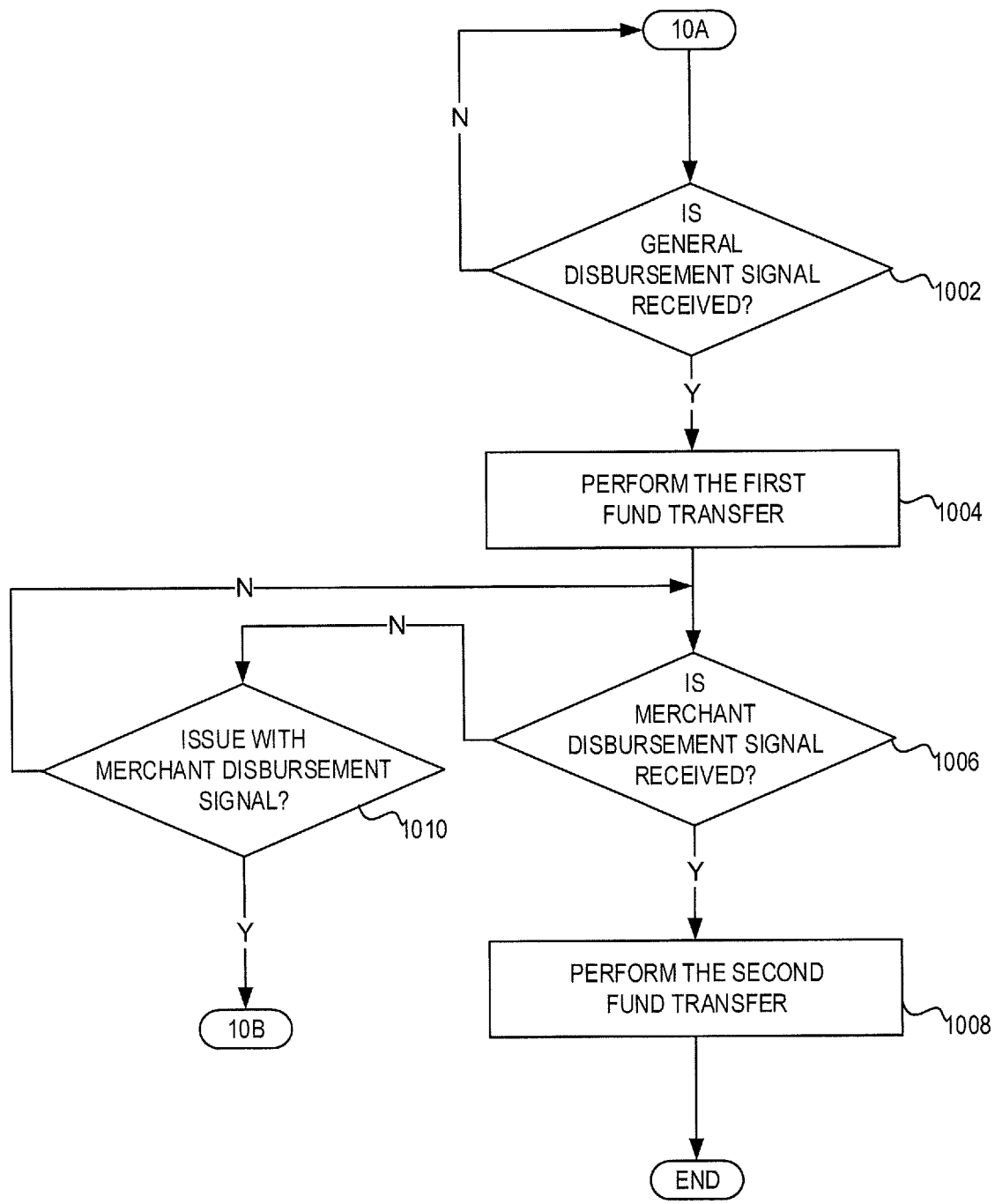
FIG. 10 is a flow diagram illustrating embodiments of operations for operating a disbursement module for managing disbursement signals.

At 910, the payment system determines whether to reconfigure the disbursement module for a different merchant disbursement signal. The payment system can determine to perform the reconfiguration in response to the disbursement module indicating that no merchant disbursement signal is received (as shown by FIG. 10). In this case, element 910 can be performed via element "10B." The payment system can also determine to perform the reconfiguration based on a determination that the merchant disbursement event (of element 904) is not optimal, such as based on additional merchant disbursement requests from the buyer, the merchant, or the marketplace.

The payment module 222 can determine whether to reconfigure the disbursement module 226 for a different merchant disbursement signal for the same merchant disbursement event. For example, the payment module 222 can determine to reconfigure the disbursement module 226 for a merchant disbursement signal from a different shipping agent, but for the same merchant disbursement event as determined at element 904.

The payment module 222 can determine whether to reconfigure the disbursement module 226 for a different merchant disbursement signal for a different merchant disbursement event. Thus, the payment module 222 can determine a new merchant disbursement event, and then determine a new merchant disbursement signal for the new merchant disbursement event. For example, the payment module 222 can determine to reconfigure the disbursement module 226 for a new merchant disbursement signal from the shipping agent 124 based on a newly determined merchant disbursement event related to shipping the item (whereas the payment module 222 determine, at 904, a previous merchant disbursement event of supplier providing the item). If the payment system determines to reconfigure the disbursement module, the payment system performs element 912 next. If the payment system determines not to reconfigure the disbursement module, the payment system performs the elements of FIG. 10 next (as shown via element "10A").

At 912, the payment system can reconfigure the disbursement module to receive a different merchant disbursement signal to trigger the second fund transfer. Depending on the determination at 912, the payment module 222 can reconfigure the disbursement module 226 for a new merchant disbursement signal from the shipping agent 124 based on a newly determined merchant disbursement event. The payment module 222 can also reconfigure the disbursement module 226 for a new merchant disbursement signal from the shipping agent 124 based on the previous merchant disbursement event. The payment system performs the elements of FIG. 10 next (as shown via the element "10A").

FIG. 10 is a flow diagram illustrating embodiments of operations for operating a disbursement module for managing disbursement signals. The method of FIG. 10 is described with reference to the systems and components described in FIGS. 1-3 (for illustration purposes and not as a limitation). The example operations can be carried out by the payment system 112. In some embodiments, elements 1002-1010 can be performed by the disbursement module 226.

At 1002, the payment system determines whether it has received the general disbursement signal. Element 1002 can be initiated via element"10A," such as from FIG. 9. The disbursement module 226 can determine whether it has received the general disbursement signal, from the first source, for triggering the first fund transfer. If the payment system has received the general disbursement signal, flow continues at 1004, otherwise the flow continues back at 1002. The disbursement module 226 can also, in response to receiving the general disbursement signal, transmit a notification to the merchant indicating that the first portion of the funds is being transferred.

The first source can be the risk module 210 or the payment module 222. The general disbursement signal can indicate that a transaction-level risk analysis (e.g., as performed by the risk module 210) on a requested transaction for purchasing the item indicates a risk level higher than a threshold. The payment module 222 can indicate that the requested transaction for purchasing the item passes the risk analysis, and the buyer and/or seller are authenticated by the authentication module 208.

As noted above, the payment system can process the cart 114 that includes a plurality of items including the item. The disbursement module 226 can be configured (e.g., at element 908) to receive multiple general disbursement signals, one for each item of the cart 114. In this example, the first fund transfer can be triggered in response to a determination by the disbursement module 226 that additional general disbursement signals associated with the plurality of items are also received.

At 1004, the payment system performs the first fund transfer in response to receiving the general disbursement signal. For example, the general disbursement signal triggers the disbursement module 226 to perform the first fund transfer. As an example, the buyer can initially indicate, to the payment system 112, a transfer of funds of $10 to purchase the item. At 1004, the disbursement module 226 can then perform the first fund transfer of funds of $10 minus any marketplace fee. In this example, the disbursement module 226 can be configured to disburse a marketplace fee of $2 to the marketplace 102. Thus, if the funds are provided by the buyer of $10 for the purchase of the item, at 1004 the disbursement module 226 can perform the first fund transfer of $8 to the general payment account, and also perform a transfer of the $2 marketplace fee to the marketplace 102.

At 1006, the payment system determines whether it has received the merchant disbursement signal. Continuing with the example above, the disbursement module 226 can determine whether it has received the merchant disbursement signal from the second source, e.g., as configured at 908. If the payment system has received the merchant disbursement signal, flow continues at 1008, otherwise the flow continues at 1010.

At 1008, the payment system performs the second fund transfer in response to receiving the merchant disbursement signal. For example, the merchant disbursement signal can trigger the disbursement module 226 to perform the second fund transfer. Continuing with the example above, the second fund transfer can be for a portion of, or entirety of, the amount of funds that was transferred to the general payment account using the first fund transfer. The disbursement module 226 can thus transfer $8 from the general payment account to the seller payment account.

At 1008, the disbursement module 226 can also transfer partner fees to one or more of the transaction partners. For example, in response to receiving the merchant disbursement signal, the disbursement module 226 can transfer a partner fee of $1 to the shipping agent 122 (e.g., to an payment account for the shipping agent 122).

At 1008, the disbursement module 226 can also transfer a payment fee to the payment system 112. For example, the payment fee can be equal to $1. For example, in response to receiving the merchant disbursement signal, the disbursement module 226 can transfer the payment fee of $1 to the payment system 112. Continuing with the example above, at 1008 the disbursement module 226 can transfer funds for the amount of $6 to the seller's payment account.

At 1010, the payment system can determine whether there is an issue with the merchant disbursement signal. If the payment system has determines there is an issue with the merchant disbursement signal, flow continues to element 910 of FIG. 9 via element "10B." Otherwise, the flow continues back to 1006. At element 910, the payment module 222 can reconfigure the disbursement module to receive a different merchant disbursement signal. The different merchant disbursement signal can be associated with the same merchant disbursement event as previously configured, or it can be a different merchant disbursement event.

The payment system can determine, for example, that for the same merchant disbursement event of shipping the item, a different shipping agent is being used to ship the item. The payment system can also determine, for example, that a different merchant disbursement signal of a different merchant disbursement event is needed. For example, the payment system can determine that the country regulations to where the item is being shipped require an expiration of a certain time as the merchant disbursement event. In another example, the buyer and/or seller may have requested a new merchant disbursement event or a new merchant disbursement signal.

In another example, the payment system can determine not to reconfigure the disbursement module and that the merchant disbursement signal is not received from the second source. The payment system can determine whether an order for the item has been cancelled. In response to a determination that whether an order for the item has been cancelled, the payment module does not perform the second fund transfer. In this example, the payment module can also initiate a refund of funds for at least a portion of the amount initially provided by the buyer.

The disbursement module 226 can also disburse funds back to the buyer in case of disputes, claims, chargebacks, and bank reversals. In one example, the payment system can receive a notification (e.g., from the buyer or from the marketplace) that the buyer has submitted an authorized transaction chargeback or bank reversal claim. If the second fund transfer has not been yet completed, the disbursement module 226 can initiate a chargeback or bank reversal, respectively, to the buyer, of the first portion of the funds. If the second fund transfer has been completed, the disbursement module 226 can initiate a chargeback or bank reversal to the buyer of the first and second portions of the funds. Similar reverse fund transfers can be performed in case of disputes and claims submitted by the buyer or the seller.

Figure 11:
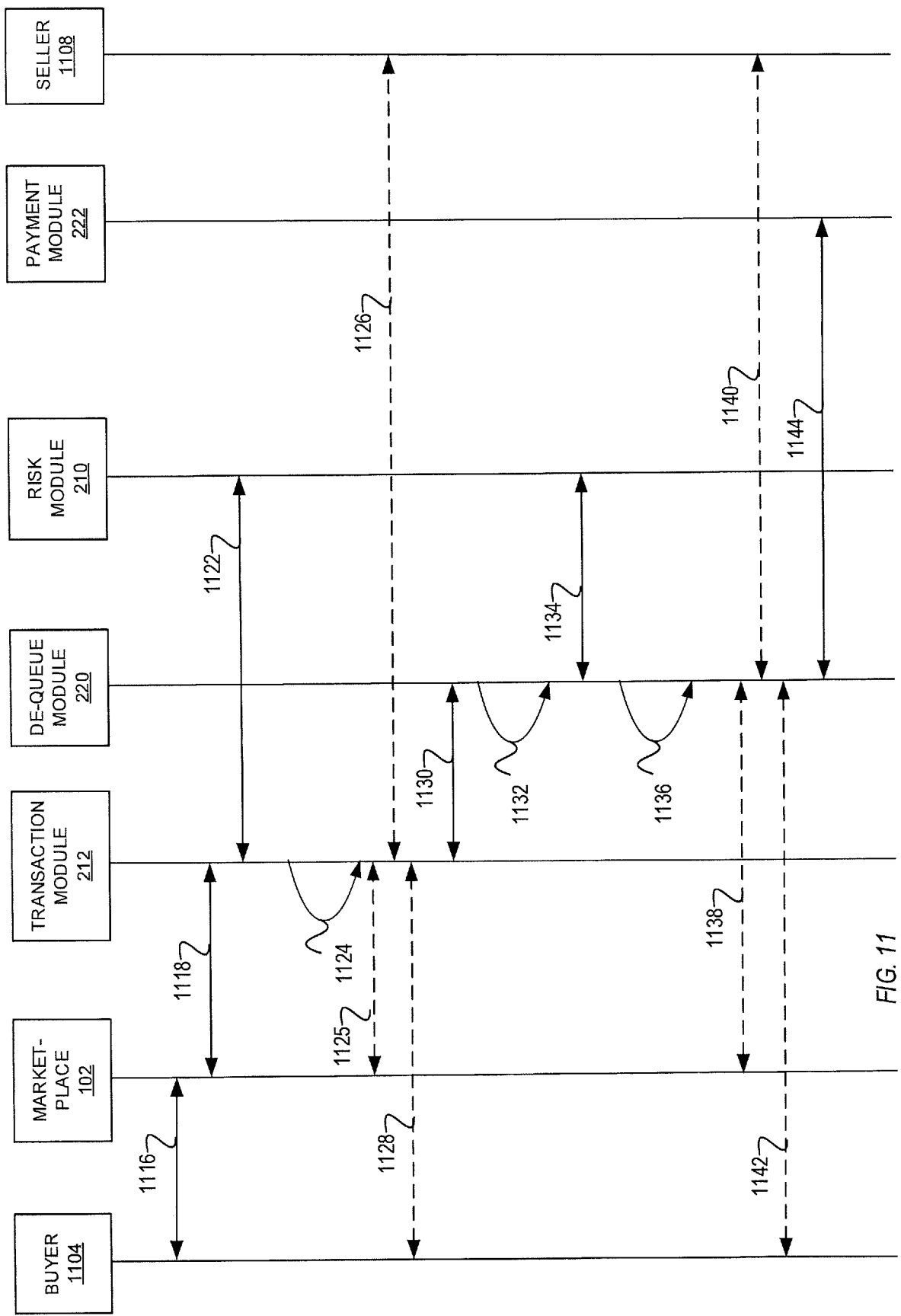
FIG. 11 is a timing diagram illustrating one embodiment of communication between various modules of a payment system communicating with an online marketplace, buyer, and a seller.

FIG. 11 is a timing diagram illustrating one embodiment of communication between various modules of a payment system communicating with an online marketplace, buyer, and a seller. As shown by FIG. 11, a buyer 1104 communicates with the marketplace 102. The buyer 1104 can be the user device 104 or the order generator 106. A seller 1108 communicates, over a communication network, with the marketplace 102. The seller 1108 can be one of the sellers 108(1)-108(3). The payment system includes the transaction module 212, the de-queue module 220, and the risk module 210. The communications of FIG. 11 can be performed over one or more communication networks, such as shown by FIG. 1. Portions of the timing diagram of FIG. 11 correspond to the flow diagrams of FIGS. 4, 5, 7, and 8.

At 1116, the buyer 1104 can communicate selections of items for purchase in a cart, such as the cart 114, via the marketplace. At 1118, the marketplace 102 communicates with the transaction module 212 of the payment system to transmit the cart for processing. At 1122, the transaction module 212 communicates with the risk module 210 to perform the initial risk analysis of the cart. At 1124, the transaction module 212 determines whether to accept the entire cart based on the initial risk analysis on the cart. At 1125, 1126, and 1128 the transaction module 212 can optionally notify the marketplace 102, the seller 1108, and the buyer, respectively, of whether the payment system accepts the entire cart. If the transaction module 212 determines to accept the cart, at 1124 the transaction module 212 can add requested transactions for the items of the cart to the transaction queue.

At 1130, the de-queue module 220 accesses the transaction queue at the transaction module 212 to select and de-queue a requested transaction. The de-queue module 220 can operate asynchronously of the transaction module 212, and thus select requested transactions independently of the transaction module 212 adding requested transactions to the transaction queue. At 1132, the de-queue module 220 can determine whether to increase a processing rate at which the requested transactions are processed (i.e., including the transaction-level risk analysis) by the risk module 1110 (and also by the payment module 222). At 1132, the de-queue module 220 can determine whether to limit the de-queue rate.

At 1134, the de-queue module 220 communicates with the risk module 210 to perform a second risk analysis on the de-queued requested transaction. At 1136, the de-queue module 220 determines whether to process the de-queued requested transaction based on the results of its second risk analysis. At 1138, 1140, and 1142 the de-queue module 220 can optionally notify the marketplace 102, the seller 1108, and the buyer 1104, respectively, of whether the payment system accepts the de-queued requested transaction. If the de-queue module 220 determines to accept the de-queued requested transaction, at 1144 the de-queue module 220 can communicate with the payment module 222 to initiate a payment process for the de-queued requested transaction.

Figure 12:
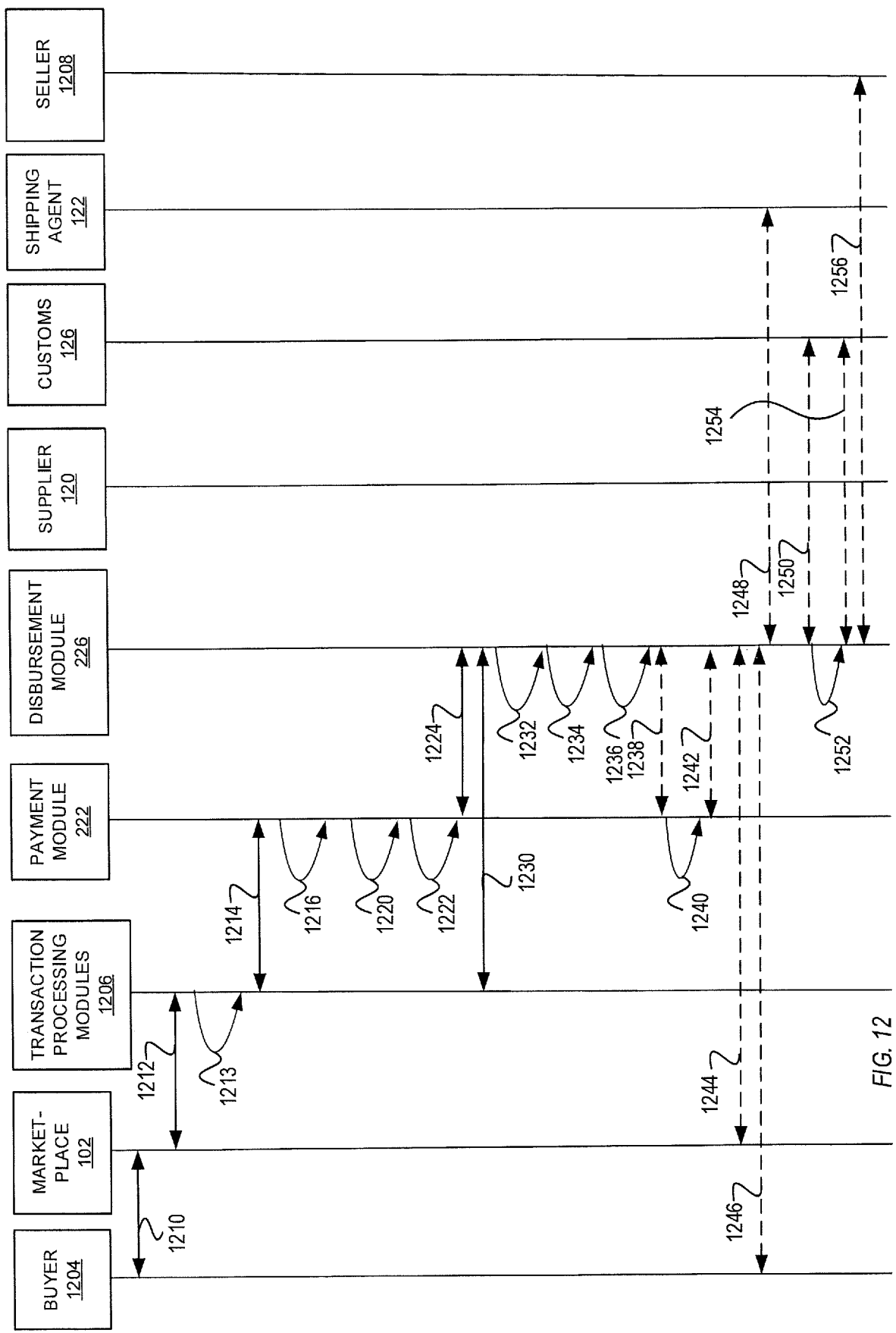
FIG. 12 is a timing diagram illustrating one embodiment of communication between various modules of a payment system when configuring and operating the disbursement module.

FIG. 12 is a timing diagram illustrating one embodiment of communication between various modules of a payment system when configuring and operating the disbursement module. As shown by FIG. 12, a buyer 1204 communicates with the marketplace 102. The buyer 1204 can be the user device 104 or the order generator 106. A seller 1208 can also communicate, over a communication network, with the marketplace 102. The seller 1208 can be one of the sellers 108(1)-108(3). Transaction processing modules 1206 can include the transaction module 212, the de-queue module 220, and/or the risk module 210, among others. The communications of FIG. 12 can be performed over one or more communication networks, such as shown by FIG. 1. Portions of the timing diagram of FIG. 12 correspond to the flow diagrams of FIGS. 9 and 10.

At 1210, the buyer 1204 can communicate selections of items for purchase in a cart, such as the cart 114, via the marketplace 102. At 1212, the marketplace 102 can transmit the cart to the payment system for processing. At 1213, the transaction processing modules 1206 can process the cart, such as discussed above with reference to FIG. 11 and/or FIGS. 4, 5, 7, and 8. At 1214, the transaction processing modules 1206 can communicate with the payment module 222 to initiate a payment process for the de-queued requested transaction (e.g., such as described above at 1144).

At 1216, the payment module 222 can select a source of a general disbursement signal. At 1220, the payment module 222 can select the merchant disbursement event. At 1222, the payment module 222 can select a source of the merchant disbursement signal based on the merchant disbursement event. At 1224, the payment module 222 can configure the disbursement module to receive the general disbursement signal to trigger the first fund transfer and to receive the merchant disbursement signal to trigger the second fund transfer.

At 1230, the disbursement module 226 can receive the general disbursement signal from the transaction processing modules 1206 (e.g., from the risk module 210). At 1232, the disbursement module 226 can determine whether it has received the general disbursement signal. At 1234, the disbursement module 226 can perform the first fund transfer in response to receiving the general disbursement signal.

At 1236, the disbursement module 226 can determine whether it has received the merchant disbursement signal, and if not, determine whether there is an issue with the merchant disbursement signal. At 1238, the disbursement module 226 can communicate with the issue with the merchant disbursement signal to the payment module 222. At 1240, the payment module 222 can determine to re-configure the disbursement module 226. At 1242, the payment module 222 can re-configure the disbursement module 226. At 1244-1250, the disbursement module 226 can receive disbursement signals from the marketplace 102, the buyer 1204, the customs 126, and/or the shipping agent 122, respectively.

At 1252, the disbursement module 226 can determine that the merchant disbursement signal has been received. In response to this determination, at 1254 the disbursement module 226 can optionally transfer funds for a partner fee to the customs 126 (such as to a customs payment account at the payment system). At 1254, the disbursement module 226 can optionally transmit a notification of the partner fee transfer to the customs 126. In response to this determination, at 1256 the disbursement module 226 can perform the second fund transfer to the seller 1208 (such as to the seller payment account). At 1256, the disbursement module 226 can optionally transmit a notification of the second fund transfer to the seller 1208. It should be understood that FIGS. 1-12 and the operations described herein are examples meant to aid in understanding embodiments and should not be used to limit embodiments or limit scope of the claims. Embodiments may perform additional operations, fewer operations, operations in a different order, operations in parallel, and some operations differently. For example, one or more elements, steps, or processes described with reference to the flow diagrams of FIGS. 4, 5, and 7-10 may be omitted, described in a different sequence, or combined as desired or appropriate.

As will be appreciated by one skilled in the art, aspects of the present disclosure may be embodied as a system, method, or computer program product. Accordingly, aspects of the present disclosure may take the form of an entirely hardware embodiment, a software embodiment (including firmware, resident software, micro-code, etc.) or an embodiment combining software and hardware aspects that may all generally be referred to herein as a "module" or "system." Furthermore, aspects of the present disclosure may take the form of a computer program product embodied in one or more computer readable medium(s) having computer readable program code embodied thereon.

Any combination of one or more computer readable medium(s) may be utilized. The computer readable medium may be a computer readable signal medium or a computer readable storage medium. A computer readable storage medium may be, for example, but not limited to, an electronic, magnetic, optical, electromagnetic, infrared, or semiconductor system, apparatus, or device, or any suitable combination of the foregoing. More specific examples (a non-exhaustive list) of the computer readable storage medium would include the following: a portable computer diskette, a hard disk, a random access memory (RAM), a read-only memory (ROM), an erasable programmable read-only memory (EPROM or Flash memory), a portable compact disc read-only memory (CD-ROM), an optical storage device, a magnetic storage device, or any suitable combination of the foregoing. In the context of this document, a computer readable storage medium may be any tangible and/or non-transitory medium that can contain, or store a program for use by or in connection with an instruction execution system, apparatus, or device.

A computer readable signal medium may include a propagated data signal with computer readable program code embodied therein, for example, in baseband or as part of a carrier wave. Such a propagated signal may take any of a variety of forms, including, but not limited to, electromagnetic, optical, or any suitable combination thereof. A computer readable signal medium may be any computer readable medium that is not a computer readable storage medium and that can communicate, propagate, or transport a program for use by or in connection with an instruction execution system, apparatus, or device.

Computer program code embodied on a computer readable medium may be transmitted using any appropriate medium, including but not limited to wireless, wireline, optical fiber cable, RF, etc., or any suitable combination of the foregoing.

Computer program code for carrying out operations for aspects of the present disclosure may be written in any combination of one or more programming languages, including an object oriented programming language such as Java, Smalltalk, C++ or the like and conventional procedural programming languages, such as the "C" programming language or similar programming languages. The computer program code may execute (e.g., as compiled into computer program instructions) entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

Aspects of the present disclosure are described with reference to flow diagram illustrations and/or block diagrams of methods, apparatus (systems) and computer program products according to embodiments of the present disclosure. It will be understood that each block of the flow diagram illustrations and/or block diagrams, and combinations of blocks in the flow diagram illustrations and/or block diagrams, can be implemented by computer program instructions. These computer program instructions may be provided to a processor of a general purpose computer, special purpose computer, or other programmable data processing apparatus to produce a machine, such that the computer program instructions, which execute via the processor of the computer or other programmable data processing apparatus, create means for implementing the functions/acts specified in the flow diagrams and/or block diagram block or blocks.

These computer program instructions may also be stored in a computer readable medium that can direct a computer, other programmable data processing apparatus, or other devices to function in a particular manner, such that the instructions stored in the computer readable medium produce an article of manufacture including instructions which implement the function/act specified in the flow diagram and/or block diagram block or blocks.

The computer program instructions may also be loaded onto a computer, other programmable data processing apparatus, or other devices to cause a series of operational steps to be performed on the computer, other programmable apparatus or other devices to produce a computer implemented process such that the instructions which execute on the computer or other programmable apparatus provide processes for implementing the functions/acts specified in the flow diagrams and/or block diagram block or blocks.

Figure 13:
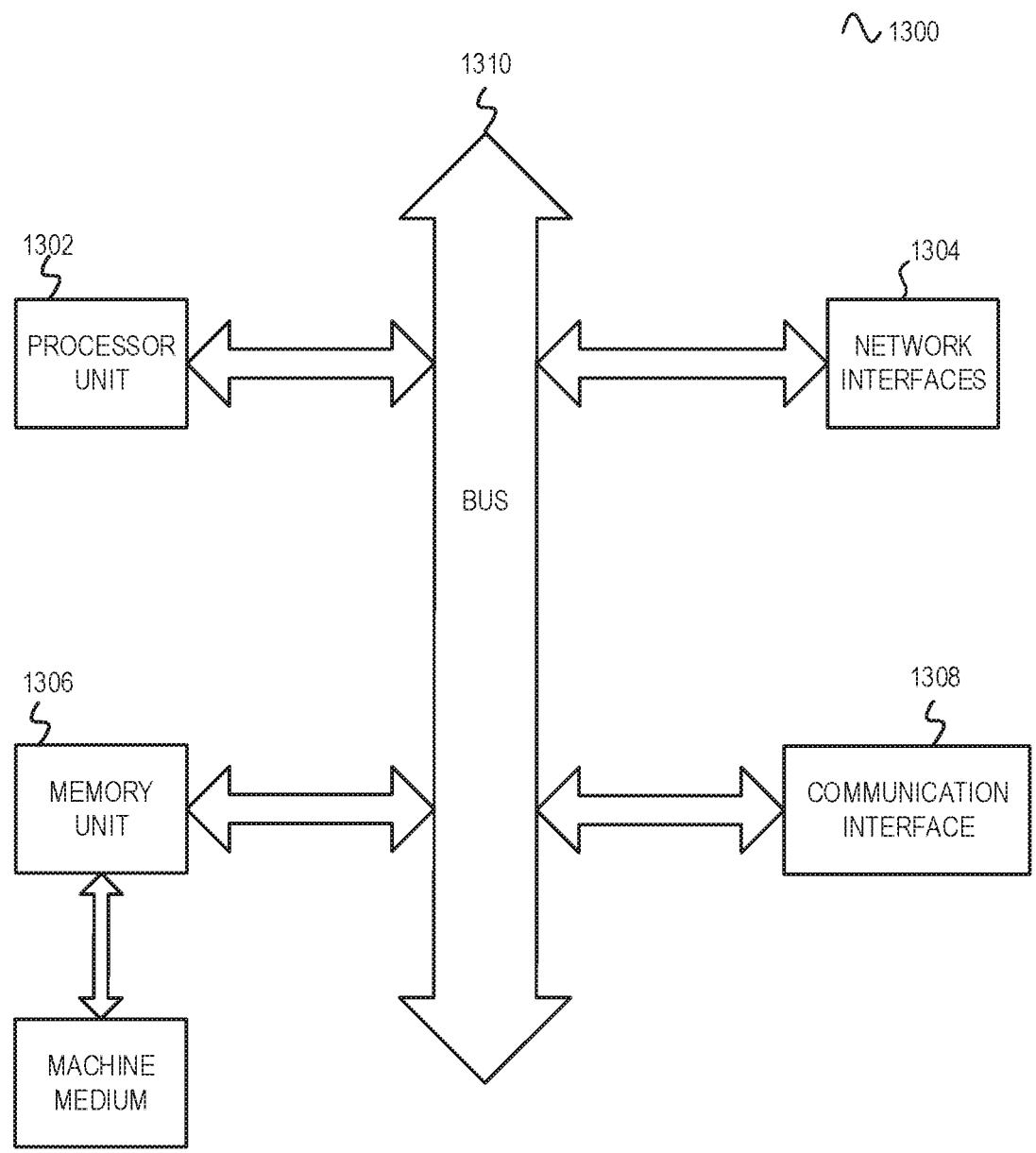
FIG. 13 is a block diagram illustrating embodiments of electronic devices used in the communication systems of FIGS. 1-3, 11, and 12.

FIG. 13 is a block diagram of one embodiment of an electronic device 1300 used in the communication systems of FIGS. 1-3, 11, and 12. In some implementations, the electronic device 1300 may be a laptop computer, a tablet computer, a mobile phone, a powerline communication device, a smart appliance (PDA), a server, and/or one or more other electronic systems. For example, a user device may be implemented using a mobile device, such as a mobile phone or a tablet computer. For example, a payment system may be implemented using one or more servers. The electronic device 1300 can include a processor unit 1302 (possibly including multiple processors, multiple cores, multiple nodes, and/or implementing multi-threading, etc.). The electronic device 1300 can also include memory unit 1306. The memory unit 1306 may be system memory (e.g., one or more of cache, SRAM, DRAM, zero capacitor RAM, Twin Transistor RAM, eDRAM, EDO RAM, DDR RAM, EEPROM, NRAM, RRAM, SONOS, PRAM, etc.) or any one or more of the above already described possible realizations of machine-readable media. The electronic device 1300 can also include a bus 1310 (e.g., PCI, ISA, PCI-Express, HyperTransport®, InfiniBand®, NuBus, AHB, AXI, etc.), and network interfaces 1304 can include wire-based interfaces (e.g., an Ethernet interface, a powerline communication interface, etc.). The electronic device 1300 includes a communication interface 1308 for network communications. The communication interface 1308 can include at least one of a wireless network interface (e.g., a WLAN interface, a Bluetooth interface, a WiMAX interface, a ZigBee interface, a Wireless USB interface, etc.), In some implementations, the electronic device 1300 may support multiple network interfaces—each of which is configured to couple the electronic device 1300 to a different communication network.

The memory unit 1306 can embody functionality to implement embodiments described in FIGS. 1-12 above. In one embodiment, the memory unit 1306 can include one or more of functionalities that facilitate management of transaction queues and managing disbursement signals at a payment system. Any one of these functionalities may be partially (or entirely) implemented in hardware and/or on the processor unit 1302. For example, some functionality may be implemented with an application specific integrated circuit, in logic implemented in the processor unit 1302, in a co-processor on a peripheral device or card, etc. Further, realizations may include fewer or additional components not illustrated in FIG. 13 (e.g., video cards, audio cards, additional network interfaces, peripheral devices, etc.). The processor unit 1302, memory unit 1306, the network interfaces 1304, and the communication interface 1308 are coupled to the bus 1310. Although illustrated as being coupled to the bus 1310, the memory unit 1306 may be coupled to the processor unit 1302.

While the embodiments are described with reference to various implementations and exploitations, it will be understood that these embodiments are illustrative and that the scope of the present disclosure is not limited to them. In general, techniques for facilitate management of transaction queues and managing disbursement signals at a payment system as described herein may be implemented with facilities consistent with any hardware system or hardware systems. Many variations, modifications, additions, and improvements are possible.

Plural instances may be provided for components, operations or structures described herein as a single instance.

Finally, boundaries between various components, operations and data stores are somewhat arbitrary, and particular operations are illustrated in the context of specific illustrative configurations. Other allocations of functionality are envisioned and may fall within the scope of the present disclosure. In general, structures and functionality presented as separate components in the exemplary configurations may be implemented as a combined structure or component. Similarly, structures and functionality presented as a single component may be implemented as separate components. These and other variations, modifications, additions, and improvements may fall within the scope of the present disclosure.

What is claimed is:

1. A method for reconfiguring disbursement signals at a payment system, the method comprising:
    receiving, from an online marketplace by a transaction module, a virtual cart comprising a plurality of items associated with one or more sellers;
    determining to accept the virtual cart for processing into a queue based on a first risk analysis performed on the virtual cart by a risk module, wherein the first risk analysis is a cart-level analysis;
    queueing a plurality of requested transactions corresponding to the plurality of items in the queue;
    determining a transaction capacity to process the plurality of requested transactions based on a number of available processing modules and a transaction request processing efficiency of each of the available processing modules;
    based on the transaction capacity to process the plurality of requested transactions, increasing or decreasing a de-queue rate of a dequeue module, wherein the de-queue rate is a rate at which the plurality of requested transactions are de-queued from the queue;
    de-queuing, by the dequeue module at the increased or decreased de-queue rate, a selected requested transaction of the plurality of requested transactions from the queue for processing;
    determining to further process the selected requested transaction based on a second risk analysis performed on the selected requested transaction by the risk module, wherein the second risk analysis is a transaction-level analysis;
    receiving a general disbursement signal from the risk module of the payment system, wherein the general disbursement signal is for triggering a first fund transfer of a first portion of funds from a buyer payment account to a general payment account at the payment system, and wherein the first fund transfer is for purchasing a cart item corresponding to the selected requested transaction;
    in response to receiving the general disbursement signal, performing the first fund transfer of the first portion of funds from the buyer payment account to the general payment account;
    receiving a merchant disbursement signal from a user device associated with a merchant payment account, wherein the merchant disbursement signal is configured to trigger a second fund transfer of a second portion of the funds from the general payment account to the merchant payment account;
    determining, based on access to a regulation data store, that the merchant disbursement signal does not match a regulation associated with the purchasing the cart item from a merchant via the online marketplace; and
    reconfiguring a disbursement module to receive a different merchant disbursement signal for triggering the second fund transfer, based at least in part on the regulation associated with the purchasing the cart item from the merchant via the online marketplace.

2. The method of claim 1,
wherein the merchant disbursement signal is associated with a merchant disbursement event for transferring the second portion of the funds.

3. The method of claim 1,
wherein the merchant disbursement signal is associated with a merchant disbursement event for transferring the second portion of the funds, and
wherein the different merchant disbursement signal is associated with a different merchant disbursement event.

4. The method of claim 1, further comprising:
reconfiguring the disbursement module to receive the different merchant disbursement signal from a receiving agent device;
receiving the different merchant disbursement signal from the receiving agent device; and
in response to the receiving the different merchant disbursement signal from the receiving agent device, performing the second fund transfer.

5. The method of claim 1, further comprising:
determining that an order for the cart item has been cancelled; and
in response to the determining that the order for the cart item has been cancelled, abstaining from performing the second fund transfer.

6. The method of claim 1,
wherein the first fund transfer is further performed in response to receiving additional general disbursement signals associated with the plurality of items excluding the cart item.

7. The method of claim 1, wherein the general disbursement signal indicates that a transaction-level risk analysis on the requested transaction for purchasing the cart item indicates a risk level higher than a threshold.

8. The method of claim 1, further comprising:
determining, based on the different merchant disbursement signal, that a marketplace fee is to be transferred from the general payment account or from the merchant payment account.

9. The method of claim 1, further comprising:
in response to receiving the general disbursement signal, transmitting a notification to the merchant indicating that the first portion of the funds is being transferred from the buyer payment account to the general payment account.

10. A system comprising:
a non-transitory memory storing instructions; and
a processor configured to execute the instructions to cause the system to:
    receive, from an online marketplace, a virtual cart comprising a plurality of items associated with one or more sellers;
    determining to accept the virtual cart for processing into a queue based on a first risk analysis performed on the virtual cart, wherein the first risk analysis is a cart-level analysis;
    queueing a plurality of requested transactions corresponding to the plurality of items in the queue;
    determining a transaction capacity to process the plurality of requested transactions based on a number of available processing modules and a transaction request processing efficiency of each of the available processing modules;

based on the transaction capacity to process the plurality of requested transactions, increasing or decreasing a de-queue rate, wherein the de-queue rate is a rate at which the plurality of requested transactions are de-queued from the queue;

de-queueing, at the increased or decreased de-queue rate, a selected requested transaction of the plurality of requested transactions from the queue for processing;

determining to further process the selected requested transaction based on a second risk analysis performed on the selected requested transaction, wherein the second risk analysis is a transaction-level analysis;

receive a general disbursement signal from the system, wherein the general disbursement signal is for triggering a first fund transfer of a first portion of funds from a buyer payment account to a general payment account at a payment system, and wherein the first fund transfer is for purchasing an item corresponding to the selected requested transaction;

in response to the receiving the general disbursement signal, perform the first fund transfer from the buyer payment account to the general payment account;

receive a merchant disbursement signal from a user device associated with a merchant payment account, the merchant disbursement signal for triggering a second fund transfer of a second portion of the funds from the general payment account to the merchant payment account; and reconfigure a disbursement module to receive a different merchant disbursement signal for triggering the second fund transfer, based at least in part on the second risk analysis performed on the selected requested transaction.

11. The system of claim 10, wherein
the merchant disbursement signal is associated with a merchant disbursement event for transferring the second portion of the funds.

12. The system of claim 10,
wherein the merchant disbursement signal is associated with a merchant disbursement event for transferring the second portion of the funds; and
wherein the different merchant disbursement signal associated with a different merchant disbursement event.

13. The system of claim 10, wherein executing the instructions further causes the system to
reconfigure the disbursement module to receive the different merchant disbursement signal from a shipping agent device; and
in response to a determination that the different merchant disbursement signal is received from the shipping agent device, perform the second fund transfer.

14. The system of claim 10,
wherein the first fund transfer is triggered in response to a determination that additional general disbursement signals associated with the plurality of items excluding the cart item are received.

15. The system of claim 10, wherein executing the instructions further causes the system to:
determine, based on the different merchant disbursement signal, that a marketplace fee is to be transferred from the general payment account or from the merchant payment account.

16. A non-transitory machine-readable medium having instructions stored thereon, the instructions executable to cause performance of operations comprising:
receiving, from an online marketplace, a virtual cart comprising a plurality of items associated with one or more sellers;
determining to accept the virtual cart for processing into a queue based on a first risk analysis performed on the virtual cart, wherein the first risk analysis is a cart-level analysis;
queueing a plurality of requested transactions corresponding to the plurality of items in the queue;
determining a transaction capacity to process the plurality of requested transactions based on a number of available processing modules and a transaction request processing efficiency of each of the available processing modules;
based on the transaction capacity to process the plurality of requested transactions, increasing or decreasing a de-queue rate of a dequeue module, wherein the de-queue rate is a rate at which the plurality of requested transactions are de-queued from the queue;
de-queuing, at the increased or decreased de-queue rate, a selected requested transaction of the plurality of requested transactions from the queue for processing;
determining to further process the selected requested transaction based on a second risk analysis performed on the selected requested transaction, wherein the second risk analysis is a transaction-level analysis;
receiving a general disbursement signal, wherein the general disbursement signal is for triggering a first fund transfer of a first portion of funds from a buyer payment account to a general payment account at a payment system, and wherein the first fund transfer is for purchasing an item corresponding to the selected requested transaction;
in response to receiving the general disbursement signal, performing the first fund transfer of the first portion of funds from the buyer payment account to the general payment account;
receiving a merchant disbursement signal from a user device associated with a merchant payment account, the merchant disbursement signal for triggering a second fund transfer of a second portion of the funds from the general payment account to a merchant payment account; and
reconfiguring a disbursement module to receive a different merchant disbursement signal for triggering the second fund transfer, based at least in part on the the second risk analysis performed on the selected transaction.

17. The non-transitory machine-readable medium of claim 16,
wherein the merchant disbursement signal is associated with a merchant disbursement event for transferring the second portion of the funds.

18. The non-transitory machine-readable medium of claim 16, wherein the operations further comprise:
reconfiguring the disbursement module to receive the different merchant disbursement signal associated with a different merchant disbursement event.

19. The non-transitory machine-readable medium of claim 16, wherein the operations further comprise:
reconfiguring the disbursement module to receive the different merchant disbursement signal from a shipment receiving agent device;

receiving the different merchant disbursement signal from the shipment receiving agent device; and in response to the receiving the different merchant disbursement signal from the shipment receiving agent device, performing the second fund transfer from the buyer payment account to the general payment account.

20. The non-transitory machine-readable medium of claim 16, wherein the operations further comprise:

determining, based on the different merchant disbursement signal, that a marketplace fee is to be transferred from the general payment account or from the merchant payment account.

* * * * *